us012085207B2

(12) United States Patent
Teasley et al.

(10) Patent No.: US 12,085,207 B2
(45) Date of Patent: Sep. 10, 2024

(54) FLUID LINE QUICK CONNECTOR WITH RETAINER AND DATA MATRIX

(71) Applicant: Norma U.S. Holding LLC, Auburn Hills, MI (US)

(72) Inventors: Lee Teasley, Berkley, MI (US); Gage Bennett, Sarnia (CA); Zeeshan Moulvi, Dexter, MI (US); Brandon Geiser, Roseville, MI (US)

(73) Assignee: Norma U.S. Holding LLC, Auburn Hills, MI (US)

( * ) Notice: Subject to any disclaimer, the term of this patent is extended or adjusted under 35 U.S.C. 154(b) by 32 days.

(21) Appl. No.: 17/955,960

(22) Filed: Sep. 29, 2022

(65) Prior Publication Data

US 2023/0108924 A1 Apr. 6, 2023

Related U.S. Application Data

(60) Provisional application No. 63/249,800, filed on Sep. 29, 2021.

(51) Int. Cl.
*F16L 37/12* (2006.01)

(52) U.S. Cl.
CPC ....... *F16L 37/1225* (2013.01); *F16L 2201/10* (2013.01)

(58) Field of Classification Search
CPC . F16L 37/0841; F16L 37/0847; F16L 37/088; F16L 37/0885; F16L 37/098; F16L 37/0985; F16L 37/12; F16L 37/1225; F16L 37/133; F16L 37/144; F16L 37/148; F16L 2201/10; F16L 2201/60
See application file for complete search history.

(56) References Cited

U.S. PATENT DOCUMENTS

| 7,845,684 B2 | 12/2010 | Gaudin |
| 8,336,919 B2 | 12/2012 | Gillet et al. |
| 9,464,852 B2 | 10/2016 | Mann et al. |
| 9,714,732 B2 | 7/2017 | Neiske |
| 10,422,459 B2 | 9/2019 | Jones et al. |

(Continued)

FOREIGN PATENT DOCUMENTS

| DE | 102012013305 A1 | 1/2014 |
| DE | 102018219440 A1 | 5/2020 |

(Continued)

OTHER PUBLICATIONS

International Search Report for International Application No. PCT/US2022/045183 dated Jan. 25, 2023 (3 pages).

(Continued)

*Primary Examiner* — Aaron M Dunwoody
(74) *Attorney, Agent, or Firm* — REISING ETHINGTON, P.C.

(57) ABSTRACT

A fluid line quick connector has a retainer and a data matrix. The retainer is caused to move via a spigot upon insertion of the spigot within the fluid line quick connector. The data matrix is obstructed by the retainer when the spigot is not inserted in the fluid line quick connector, and is revealed when the spigot is inserted in the fluid line quick connector. When obstructed, a suitable reading and scanning of the data matrix cannot take place. And when revealed, in contrast, a suitable reading and scanning of the data matrix can occur.

20 Claims, 14 Drawing Sheets

(56) References Cited

U.S. PATENT DOCUMENTS

| | | |
|---|---|---|
| 11,384,880 B2 | 7/2022 | Hunt et al. |
| 2012/0242080 A1 | 9/2012 | Nezu |
| 2013/0278635 A1 | 10/2013 | Maggiore |
| 2015/0186837 A1 | 7/2015 | Bianco et al. |
| 2017/0203860 A1 | 7/2017 | Py et al. |
| 2019/0242508 A1 | 8/2019 | Gaurat et al. |
| 2019/0333420 A1 | 10/2019 | Danielson et al. |
| 2020/0166167 A1 | 5/2020 | Hagen et al. |
| 2020/0191310 A1 | 6/2020 | Kim et al. |
| 2020/0309298 A1 | 10/2020 | Kuhn et al. |
| 2020/0355308 A1* | 11/2020 | Hunt .................. F16L 37/144 |
| 2021/0054957 A1 | 2/2021 | Gocha et al. |
| 2021/0231254 A1 | 7/2021 | Baudoin et al. |
| 2021/0285581 A1 | 9/2021 | Rydin et al. |
| 2022/0003347 A1 | 1/2022 | Barthel et al. |
| 2022/0026002 A1 | 1/2022 | Gocha et al. |
| 2022/0299143 A1 | 9/2022 | Gabbey et al. |
| 2024/0068610 A1 | 2/2024 | Hunt et al. |

FOREIGN PATENT DOCUMENTS

| | | |
|---|---|---|
| DE | 202020103903 U1 | 7/2020 |
| EP | 3736481 A1 | 11/2020 |
| JP | 2010261588 A | 11/2010 |
| KR | 101829496 B1 | 2/2018 |
| KR | 101966161 B1 | 4/2019 |
| WO | WO2016099257 A1 | 6/2016 |
| WO | WO2019126447 A1 | 6/2019 |
| WO | WO2022106884 A1 | 5/2022 |
| WO | WO2022128266 A1 | 6/2022 |

OTHER PUBLICATIONS

Written Opinion for International Application No. PCT/US2022/045183 dated Jan. 25, 2023 (5 pages).

International Search Report for International Application No. PCT/US2023/033496 dated Jan. 18, 2024 (4 pages).

Written Opinion for International Application No. PCT/US2023/033496 dated Jan. 18, 2024 (6 pages).

* cited by examiner

FLUID LINE QUICK CONNECTOR WITH RETAINER AND DATA MATRIX

CROSS-REFERENCE TO RELATED APPLICATION

This application claims the benefit of U.S. Provisional Patent Application No. 63/249,800, with a filing date of Sep. 29, 2021, the contents of which are hereby incorporated by reference in their entirety.

TECHNICAL FIELD

This disclosure relates generally to quick connectors used to join fluid lines together, and to ways of verifying that proper connection have been made with the quick connectors.

BACKGROUND

Quick connectors are commonly used to join fluid lines together in vehicle applications, or to join a fluid line with a component line. The quick connectors establish a fluid-tight joint. One example is coolant fluid lines for batteries in electric or hybrid vehicle automobiles. Still, other examples exist in automotive applications, as well as in non-automotive applications like industrial-manufacturing, aerospace, marine, and agricultural applications, to name a few. For initial assembly and inspection and subsequent service, visual measures are sometimes employed in quick connectors in order to verify that a proper connection has been made. These measures typically call for physical interaction and viewing by an assembler, inspector, and servicer to confirm the establishment of the intended connection. In other words, the measures for verification are often person-dependent.

SUMMARY

In an embodiment, a fluid line quick connector may include a housing, a data matrix, and a retainer. The housing has a main passage and one or more windows. The retainer can be located in the window(s). A portion of the retainer partially or more obstructs the data matrix when a spigot is not inserted in the housing's main passage. The partial or more obstruction of the data matrix by the retainer's portion is absent when the spigot is fully inserted in the housing's main passage.

In another embodiment, a fluid line quick connector may include a housing, a slide, a data matrix, and a retainer. The slide can be moved from a first position to a second position. The first and second positions are with respect to the housing. The data matrix can move with the slide. The retainer has a portion that partially or more obstructs the data matrix when the slide is in the first position. The partial or more obstruction of the data matrix by the retainer's portion is absent when the slide is in the second position.

In yet another embodiment, a fluid line quick connector may include a housing, a slide, a data matrix, and a retainer. The housing has a main passage, a slot, and one or more windows. The slide is received in the slot. The slide can translate in the slot from a first position to a second position. The slide has a detent. The data matrix is carried by the slide. The retainer can be located in the window(s). A portion of the retainer partially or more obstructs the data matrix when the slide is in the first position. The partial or more obstruction of the data matrix by the retainer's portion is absent when the slide is in the second position. Abutment between the retainer and the slide's detent precludes movement of the slide in one or more directions when the slide is in the first position. And abutment between the retainer and the slide's detent precludes movement of the slide in one or more directions when the slide is in the second position.

BRIEF DESCRIPTION OF THE DRAWINGS

Embodiments of the disclosure are described with reference to the appended drawings, in which.

DETAILED DESCRIPTION

Embodiments of a fluid line quick connector (hereafter, quick connector) with a retainer and a data matrix are detailed in this description and depicted in the figures. The retainer interacts with the data matrix—and in addition to its retention functionality—by obstructing and revealing the data matrix amid use of the quick connector, as described in more detail below. The quick connector and its data matrix enable determination of a proper connection, or lack thereof, via a device that is located remote of an immediate site of securement of the quick connector, and the device need not necessarily make physical contact with the site of securement for the determination. Detection and verification of connection can hence be carried out remotely, and in some cases in addition to other measures of physical and visual verification. By way of its remote verification capabilities, the quick connector is equipped for initial assembly, subsequent quality inspection, and subsequent service techniques that are at least partly automated and robotic. This description presents the quick connector in the context of automotive fluid lines, such as coolant fluid lines for batteries in electric or hybrid vehicles, but the quick connector has broader application and is suitable for use in industrial-manufacturing fluid lines, aircraft fluid lines, marine fluid lines, and agricultural fluid lines, as well as others.

Figure 1:
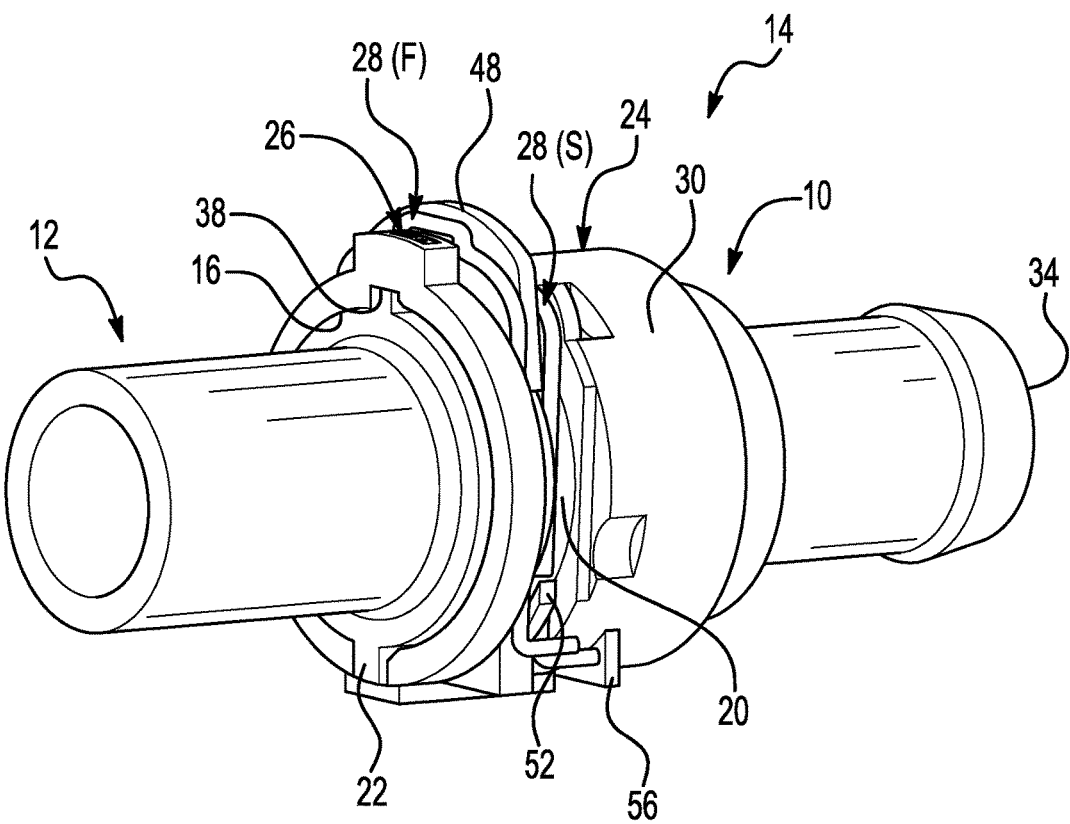
FIG. 1 is a perspective view of an embodiment of a fluid line quick connector, showing a retainer in a first position and in a second position.
Figure 2:
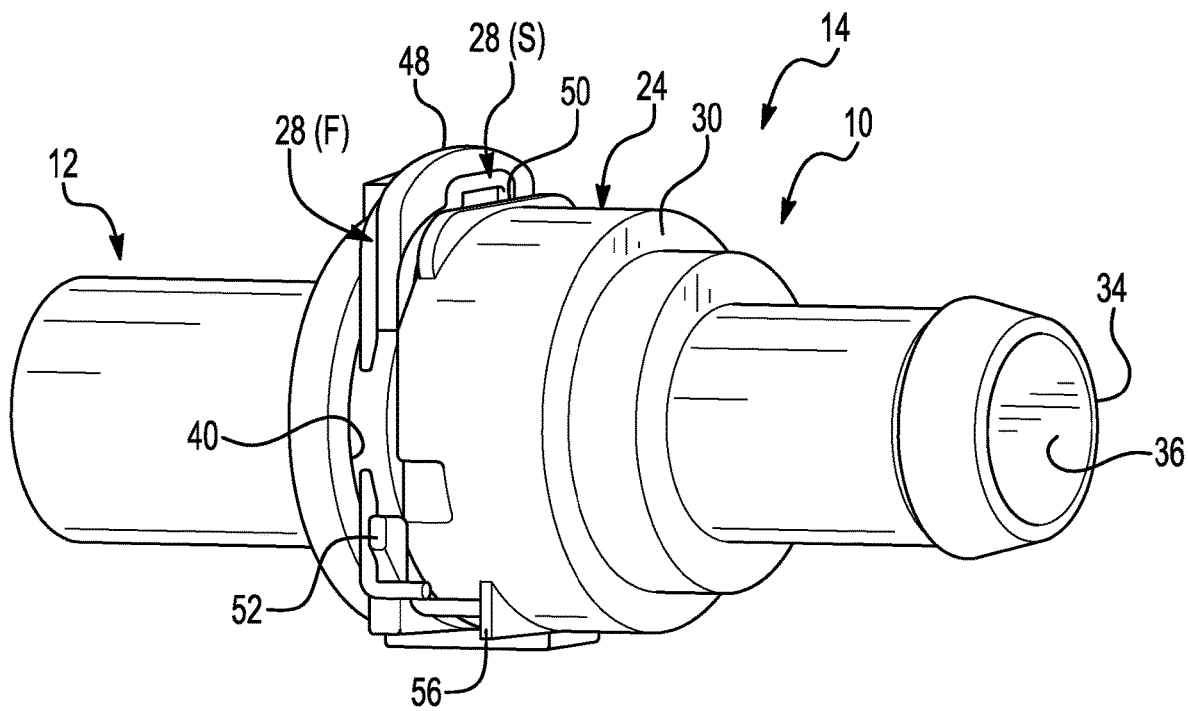
FIG. 2 is another perspective view of the quick connector, showing the retainer in the first and second positions.
Figure 3:
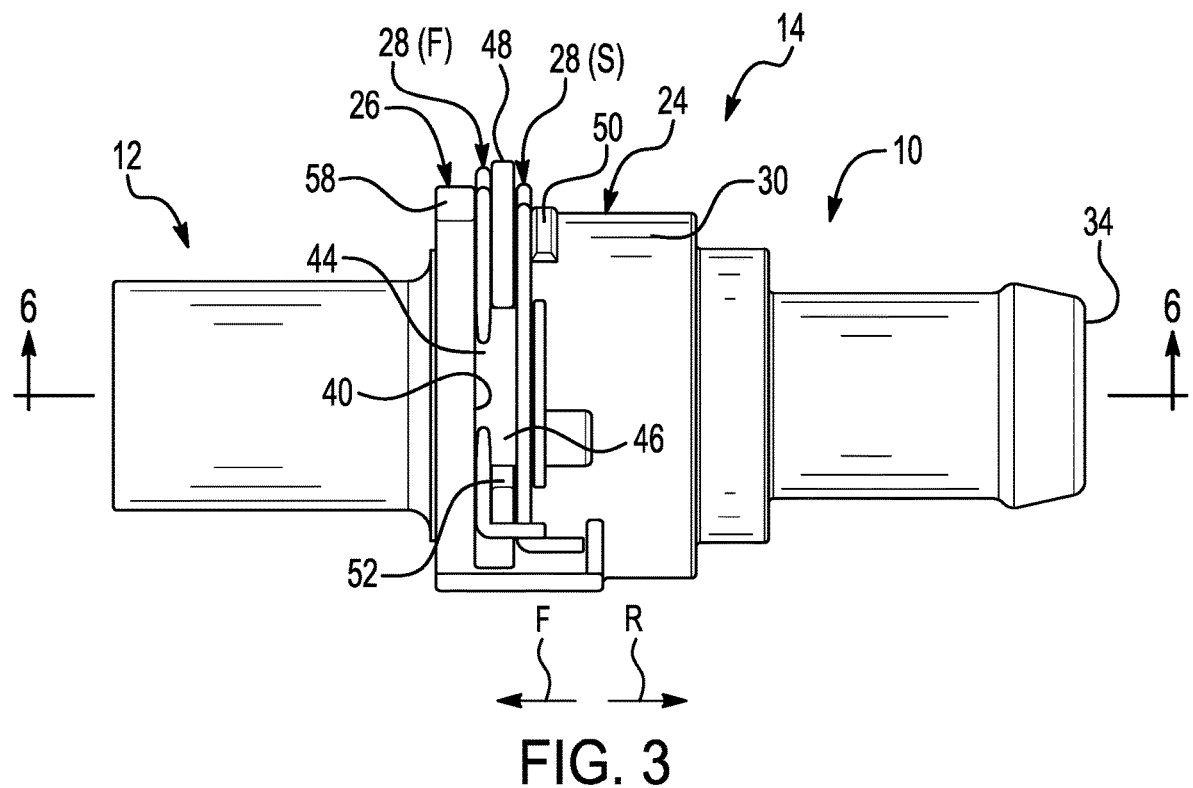
FIG. 3 is a side view of the quick connector, showing the retainer in the first and second positions.
Figure 4:
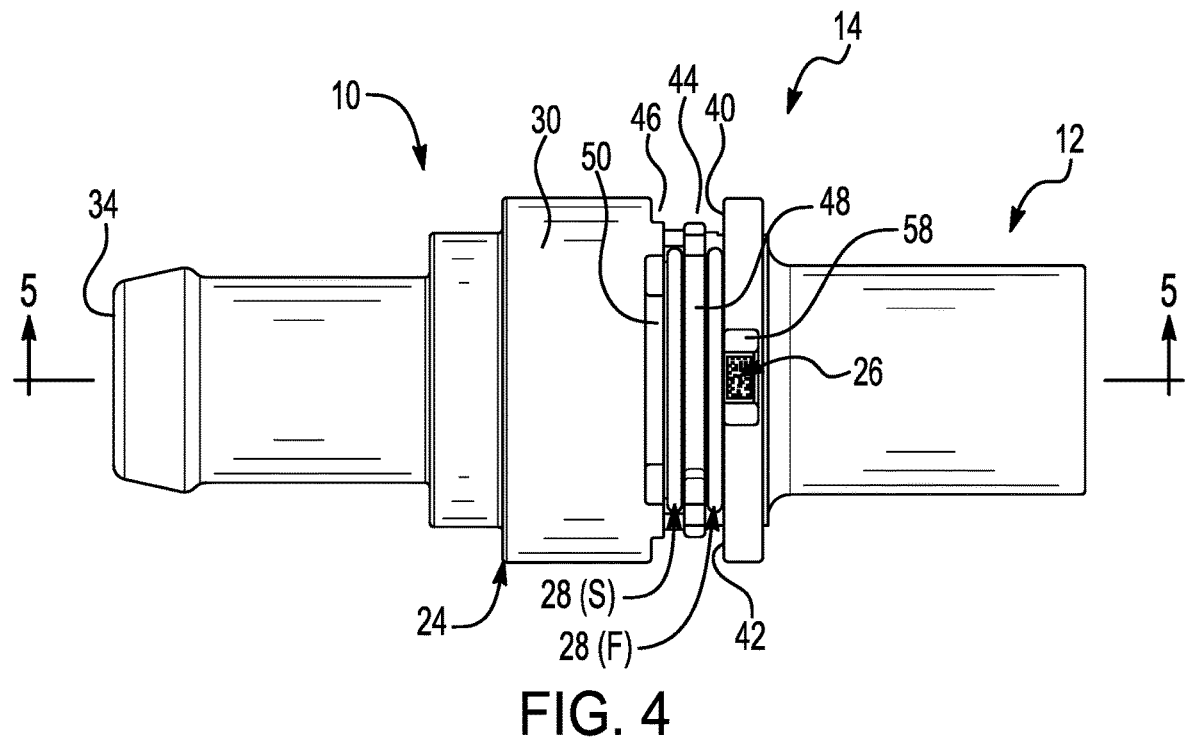
FIG. 4 is a top view of the quick connector, showing the retainer in the first and second positions.

Furthermore, unless otherwise specified, the terms radially, axially, and circumferentially, and their grammatical variations refer to directions with respect to the generally circular and cylindrical shape of the quick connector and its components as illustrated in the figures. In FIG. 3, an axially-forward direction F and an axially-rearward direction R are presented as references for those directions as used herein.

Figure 5:
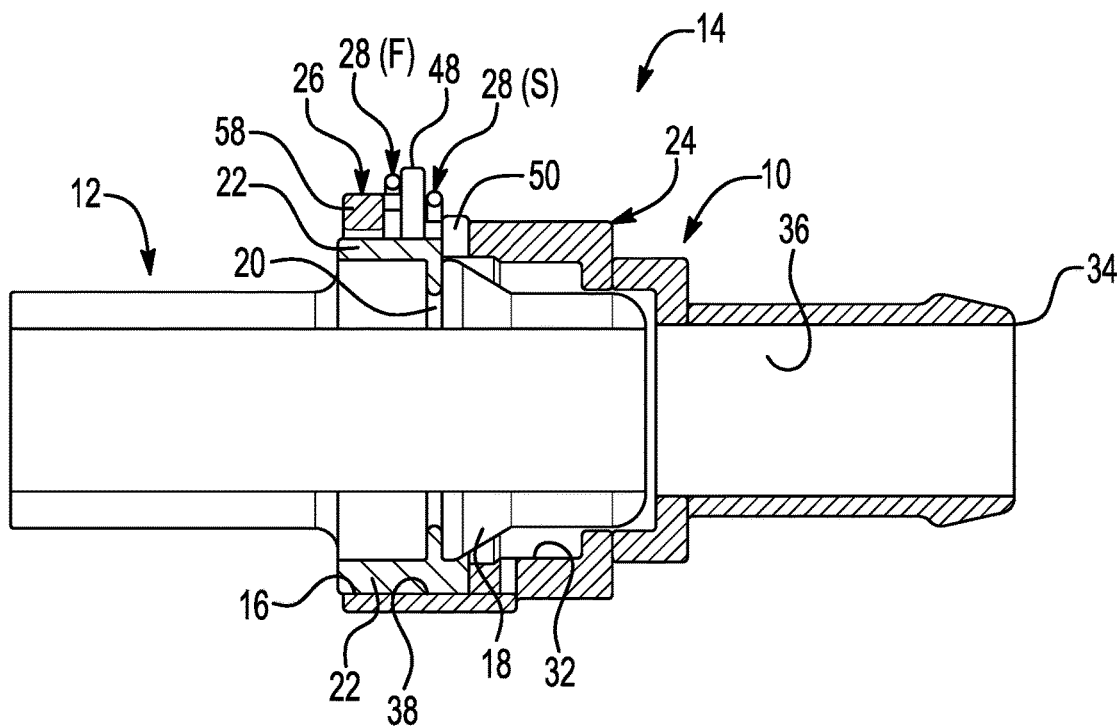
FIG. 5 is a sectional view of the quick connector taken at arrowed lines 5-5 in FIG. 4.
Figure 6:
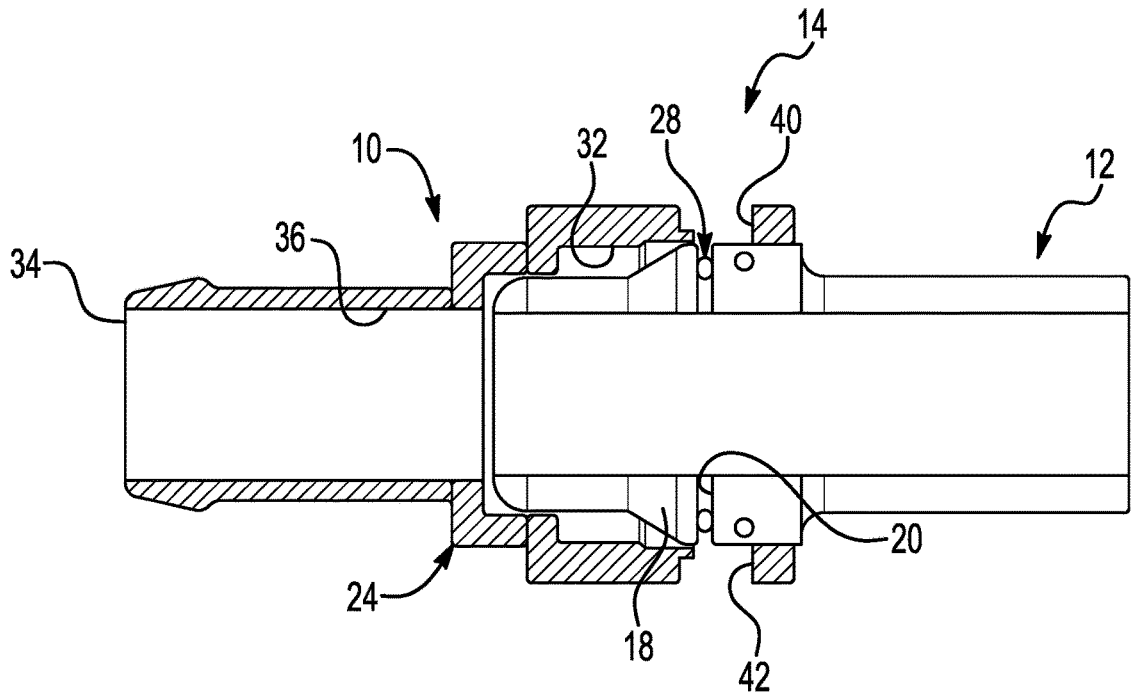
FIG. 6 is a sectional view of the quick connector taken at arrowed lines 6-6 in FIG. 3.
Figure 7:
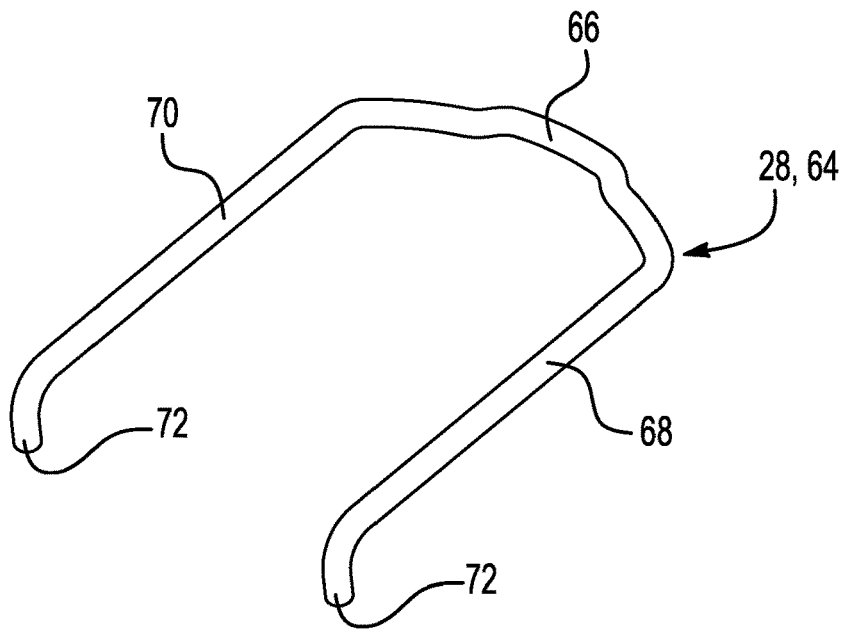
FIG. 7 is a perspective view of an embodiment of a retainer that can be used with the quick connector.

The quick connector can have various designs, constructions, and components in different embodiments, depending in some cases on the application in which the quick connector is installed, on an associated spigot, hose, and/or tube, and on the desired attributes of the connection and joint established, among other possible factors. FIGS. 1-8C present an embodiment of a fluid line quick connector 10. The quick connector 10 has quick-connect functionality for ready connect and disconnect actions with a spigot 12, and can connect with a rubber hose or a plastic tube, for example. Together, the quick connector 10 and spigot 12 establish a larger fluid line quick connector assembly 14. The spigot 12 is a separate and discrete component from the quick connector 10 that is inserted into a first open end 16 of the quick connector 10. In this sense, the quick connector 10 is a female counterpart and the spigot is a male counterpart. The spigot's end formation that is inserted into the quick connector 10 can have differing designs and constructions, depending on the application. With particular reference to FIGS. 5 and 6, in this example the spigot 12 has a ramp 18 distanced from the spigot's terminal end. The ramp 18 expands in diameter over its axial extent from a location closer to the spigot's terminal end and to a location farther from the spigot's terminal end. A groove 20 resides at a far end of the ramp 18. The groove 20 accepts reception of a retainer (introduced below) for securing the quick connector 10 and spigot 12 to each other. Further, a pair of keying ridges 22 protrudes radially-outboard of the spigot's body, and serves as indexing members for circumferentially locating the spigot 12 and quick connector 10 relative to each other during insertion. The keying ridges 22 are received in complementary interior grooves (introduced below) of the quick connector 10. The keying ridges 22 are located one-hundred-and-eighty degrees (180°) circumferentially apart from each other in this example. Moreover, the spigot 12 can be part of a larger component of the accompanying vehicle, per an example. Still, in other examples the spigot 12 can have other end formations; for instance, other kinds of indexing features can be provided and at different locations, or can be altogether absent.

The quick connector 10 is shown with an in-line configuration in the figures, but could have an elbow or L-shaped configuration in other embodiments. With more general reference to FIGS. 1-6, in this embodiment the quick connector 10 includes a housing 24, a data matrix 26, and a retainer 28; still, in other embodiments, the quick connector 10 could have more, less, and/or different components. The housing 24 serves as the main body of the quick connector 10 and is typically composed of a plastic material. The housing 24 has an exterior surface 30. A main passage 32 is defined fully through the housing 24 end-to-end for allowing fluid-flow through the quick connector 10 amid use. The main passage 32 spans axially through the housing 24 between the first open end 16 and a second, opposite open end 34. The main passage 32 accepts insertion of the spigot 12. An interior surface 36 partly or more defines the main passage 32. A pair of grooves 38 resides at the main passage 32 and near the first open end 16. The grooves 38 accept insertion of the keying ridges 22. In order to form seals and to facilitate securement between the quick connector 10 and the spigot 12 when they come together, one or more o-rings, spacers, and/or bushings (none shown) can be situated within the main passage 32.

Figure 8A:
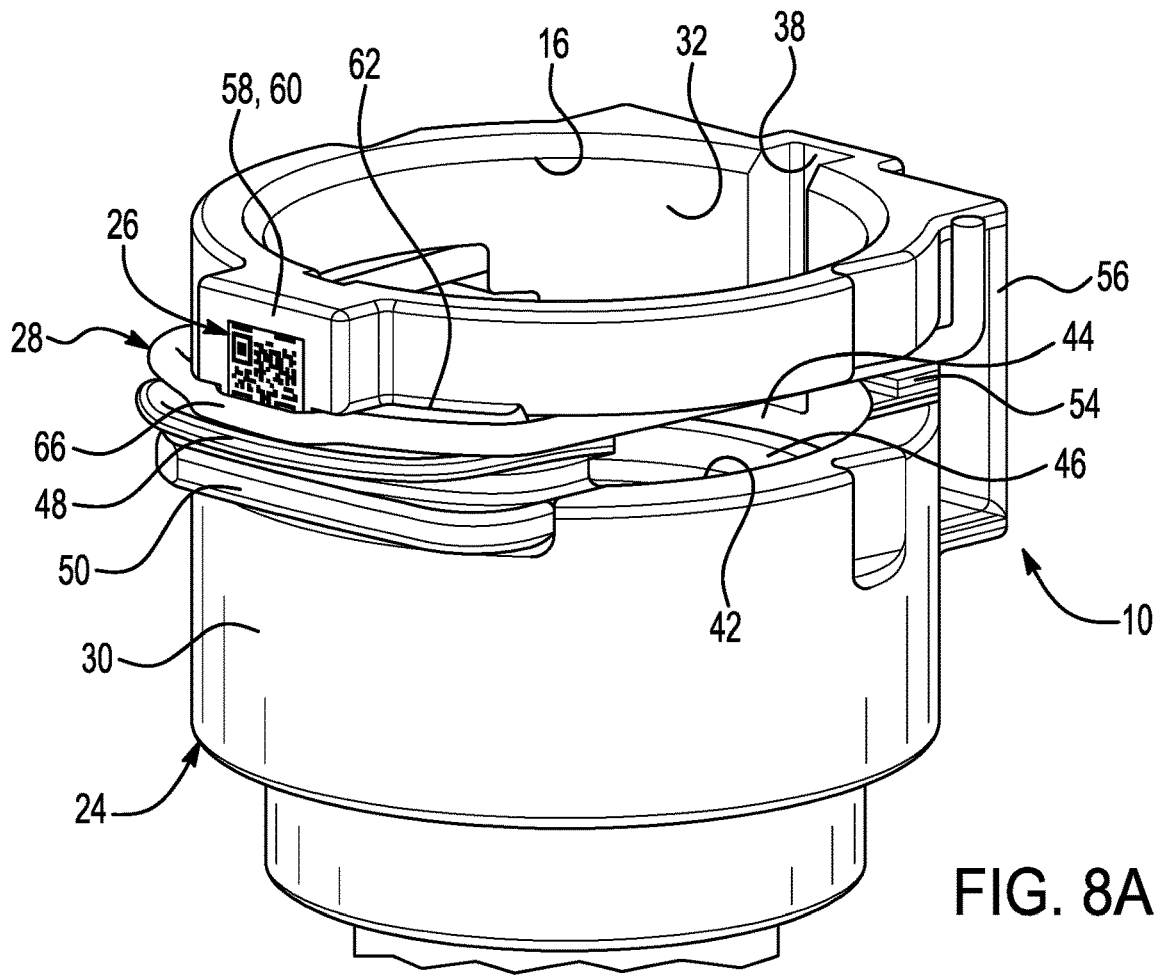
FIG. 8A shows a first position of the retainer with respect to the quick connector.
Figure 8B:
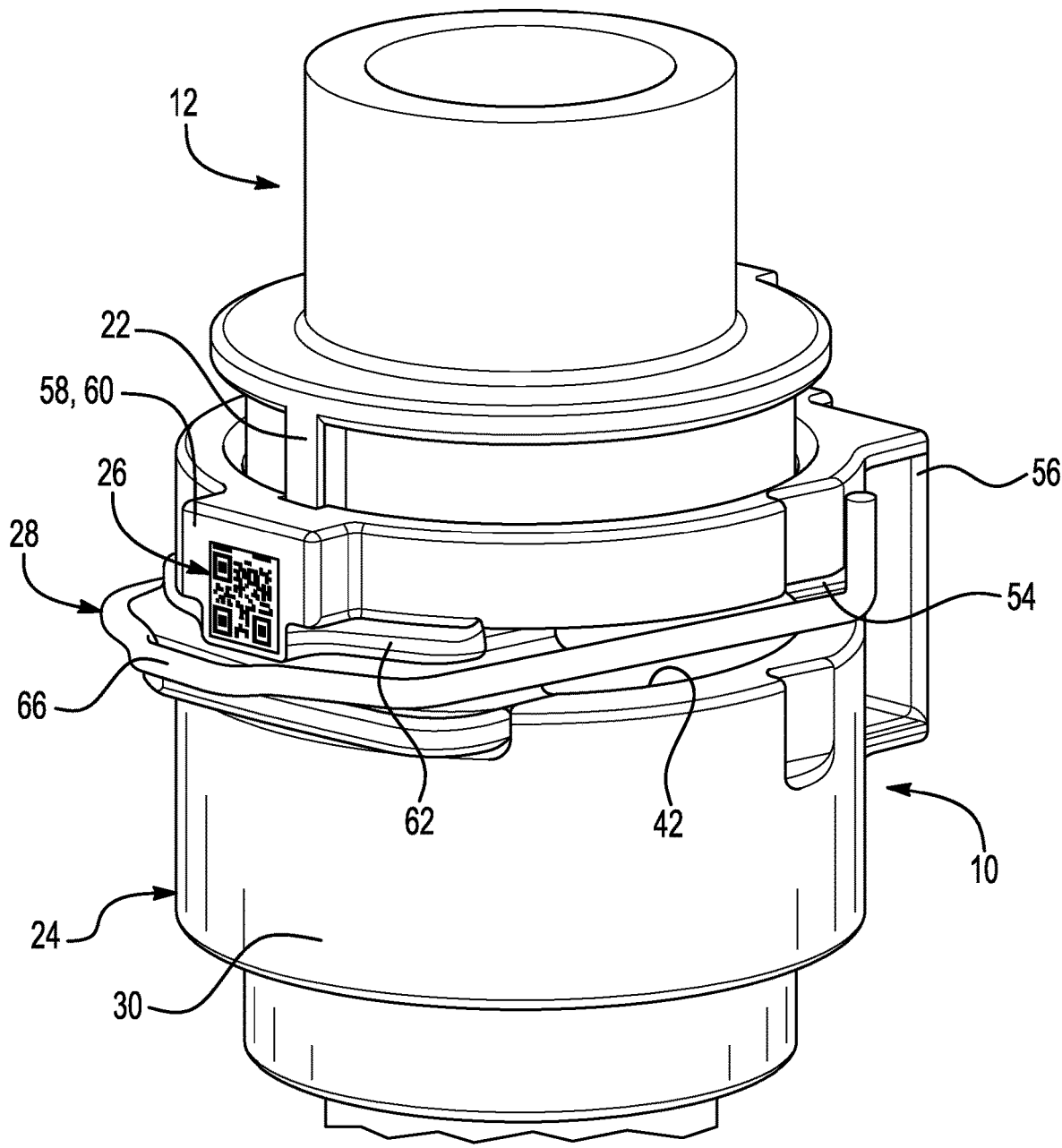
FIG. 8B shows a subsequent position of the retainer with respect to the quick connector.
Figure 8C:
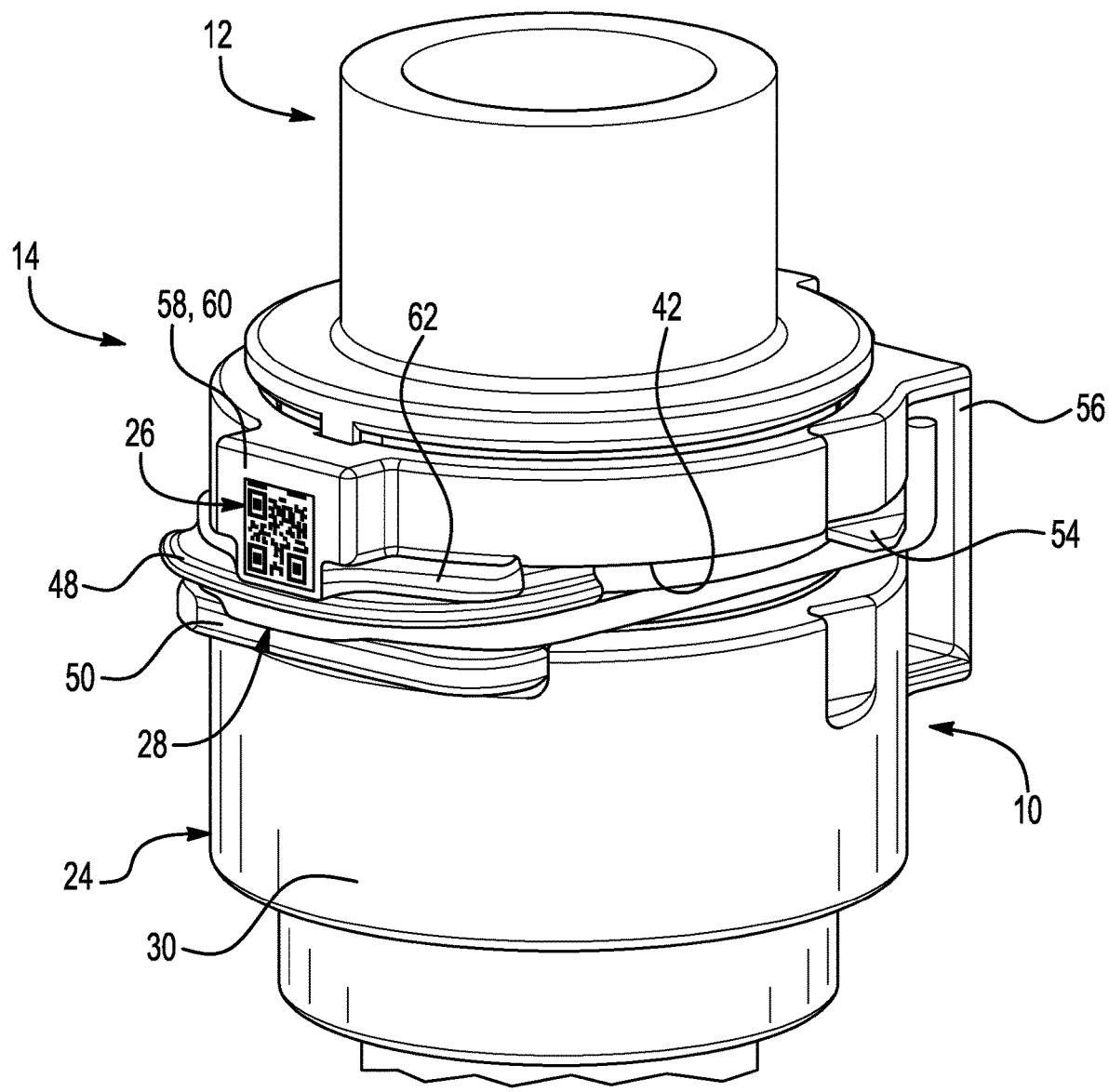
FIG. 8C shows a second position of the retainer with respect to the quick connector.

Furthermore, for cooperation with the retainer 28, the housing 24 has windows and ribs. In this embodiment, a first window 40 resides on one side of the housing 24 and a second window 42 resides on an opposite side of the housing 24. The first and second windows 40, 42 serve as pass-throughs and accept reception of leg portions (introduced below) of the retainer 28 during use of the quick connector 10. The first and second windows 40, 42 are defined wholly through the housing 24 and are bounded at their perimeters by the housing's wall. The first and second windows 40, 42 are open to the main passage 32, are located adjacent the first open end 16, and have circumferential extents that constitute their principal extents. In the embodiment here, each of the first and second windows 40, 42 has a forward region 44 and a rearward region 46. The forward and rearward regions 44, 46 are established by axial and circumferential areas of the larger first and second windows 40, 42. With particular reference to FIGS. 3, 8A, and 8C, a leg portion of the retainer 28 is located at or near, or passes through, the forward region 44 when the retainer 28 is in its first position, and the retainer's leg portion is similarly located at or near or, passes through, the rearward region 46 when the retainer 28 is in its second position.

The ribs can vary in quantity, location, and purpose in different embodiments. In an embodiment, and with particular reference to FIGS. 1-4, there is a total of four ribs: a first rib 48, a second rib 50, a third rib 52, and a fourth rib 54. The first rib 48 helps maintain the location of the retainer 28 when the retainer 28 is in the first position, and helps shield the retainer 28 from inadvertent contact and unwanted dislodging of the retainer 28 during shipping and part handling. The first rib 48 interacts with a bridge portion (introduced below) of the retainer 28. The first rib 48 protrudes radially-outboard from the housing's exterior surface 30, and exhibits a radially-outboard extension that exceeds a radially-outboard location of the retainer 28 when in the first position and in the second position. Further, the first rib 48 is located immediately axially-rearward of the data matrix 26. The second rib 50, on the other hand, helps maintain the location of the retainer 28 when the retainer 28 is in the second position, and can help shield the retainer 28 from inadvertent contact and unwanted dislodging amid use.

The second rib 50 protrudes radially-outboard from the housing's exterior surface 30, and exhibits a radially-outboard extension that is less than that of the first rib 48. The second rib 50 is spaced axially-rearward of the first rib 48.

Like the first rib 48, the third and fourth ribs 52, 54 help maintain the location of the retainer 28 when the retainer 28 is in the first position, and helps shield the retainer 28 from inadvertent contact and unwanted dislodging during shipping and part handling. The third rib 52 protrudes radially-outboard at a circumferential far end of the first window 40 relative to the first rib 48, and the fourth rib 54 protrudes radially-outboard at a circumferential far end of the second window 42 relative to the first rib 48. The third and fourth ribs 52, 54 interact with the retainer's leg portions. To facilitate the interaction, the third rib 52 can be suspended partly in the first window 40, and the fourth rib 54 can be suspended partly in the second window 42. Still, in other embodiments, including the embodiment of FIG. 9, the third and fourth ribs 52, 54 need not be provided and can be absent. Furthermore, a cover, sub-housing, or some other structure 56 can be provided on each side of the housing 24 in order to help shield feet portions (introduced below) of the retainer 28 from inadvertent contact and unwanted dislodging when in the second position, and can check the retainer's movement to the second position.

The data matrix 26 assists in the detection and verification of an intended and proper connection between the quick connector 10 and the spigot 12, or a lack thereof. Only when the retainer 28 is moved from the first position can the data matrix 26 be appropriately read and scanned by a device. Absent that condition, such as when the retainer 28 is in the first position or in close proximity to the first position, the device is unable to suitably read and scan the data matrix 26. The ability to read the data matrix 26 can serve as an indication that the retainer 28 is in the second position, and ultimately that connection has been made between the quick connector 10 and the spigot 12. Conversely, the inability to read the data matrix 26 can serve as an indication that the retainer 28 is in the first position, and ultimately that connection has not been made between the quick connector 10 and the spigot 12. Moreover, the detection and verification furnished by the data matrix 26 may be supplemental to other measures of physical and visual verification exhibited by the quick connector 10, depending on the particular embodiment. In the embodiments of FIGS. 1-9, for example, verification of connection is also had by observing the location of the retainer 28 on the housing 24 in applications where such observation is available. Additional verification via the data matrix 26 may be desired and useful in applications where making the intended connection is of increased criticality, and/or in applications where access to the quick connector 10 for verification purposes may not be readily available (e.g., enclosures, closed battery packs in electric vehicles). Furthermore, the device can read and scan the data matrix 26 remote of, and physically distanced from, the quick connector 10, and can do so without physical contact with the quick connector 10. The device can be a data matrix scanner or reader. In a manufacturing setting, for instance, the device can be stationed among an assembly, inspection, and/or installation production line, as well as elsewhere. The device could also be a hand-held device carried by an operator, assembler, or inspector.

The data matrix 26 can have various forms in different embodiments. The data matrix 26 can be a two-dimensional machine-readable code consisting of a black and white pattern, for instance. Examples include quick response (QR) codes, barcodes, shot codes, color codes, visual codes, as well as many others; in this regard, the phrase "data matrix" is used expansively herein to cover all of these forms. Depending on its form, the data matrix 26 can encode information and data with letters and/or digits, and could communicate part indicia, location of installation indicia, date of installation indicia, or some other information. The data matrix 26 can be marked on labels or other substrates that are then adhered in place, or can be marked directly in place on the quick connector 10 or on a component thereof such as by way of printing or laser etching. In the embodiments of FIGS. 1-9, the data matrix 26 resides on the exterior surface 30 of the housing 24 and is generally accessible at the housing's exterior. The data matrix 26 is located adjacent and near the first open end 16. With respect to the first rib 48, the data matrix 26 is located axially-forward of the first rib 48—indeed, as perhaps shown best by FIG. 8C, the data matrix 26 can span all-the-way to the first rib 48 in the axial direction. The data matrix 26 and first rib 48 can be adjoined at their intersection. To facilitate interaction with the retainer 28, the data matrix 26 in this embodiment resides on a raised platform 58 of the housing 24. The platform 58 protrudes radially-outboard of its surrounding area at the housing's exterior surface 30. The platform 58 has a platform surface 60 that is generally planar for accepting residence or placement of the data matrix 26. Further, raised ridge formations 62 can span circumferentially from opposite sides of the platform 58. The retainer's bridge portion sits on the ridge formations 62 when the retainer 28 is in the first position. Lastly, amid movement of the retainer 28 from the first position to the second position and otherwise, the data matrix 26 remains static on the platform 58 and relative to the housing 24, and the platform 58 remains static—in other words, unlike past constructions, revealing of the data matrix 26 in the embodiment of FIGS. 1-9 is not dependent upon its own movement or displacement.

The retainer 28 keeps hold of the spigot 12 once the spigot 12 is inserted properly into the quick connector 10 and the retainer 28 is in the second position. The quick connector 10 and spigot 12 are secured together via the retainer 28. In contrast to past quick connectors, the retainer 28 further serves to partially or more conceal and obstruct the data matrix 26 from reading and scanning when the retainer 28 is in the first position, and serves to reveal the data matrix 26 for suitable reading and scanning when the retainer 28 is in the second position. The ability and inability to read and scan the data matrix 26 is carried out in coordination with the movements of the retainer 28 between its first and second positions.

The retainer 28 can have various forms in different embodiments. In the embodiments of FIGS. 1-9, and with particular reference to FIG. 7, the retainer 28 is in the form of a wire spring 64. Overall, the retainer 28 is one-piece, is composed of a metal material, and generally resembles a U-shape. The retainer 28 has a bridge portion 66, a first leg portion 68, a second leg portion 70, and a pair of feet portions 72. The bridge portion 66 can remain at the housing's exterior and external of the main passage 32 during use, and presents a structure for disassembly and removal of the retainer 28. The bridge portion 66 is situated axially-forward of the first rib 48 when the retainer 28 is in the first position, and is conversely situated axially-rearward of the first rib 48 when the retainer 28 is in the second position. When axially-forward of the first rib 48, the bridge portion 66 physically overlaps and obstructs and blocks a section or more of the data matrix 26. The blocked section is a lateral extent and portion of the data matrix 26, per this embodiment. The bridge portion 66 and first rib 48 have circumferential locations that generally coincide in assembly and use, as shown in the figures. The first and second leg portions, or prongs, 68, 70 are unitary extensions of the bridge portion 66, and depend from opposite sides of the bridge portion 66. The first and second leg portions 68, 70 are mirror images of each other. The first leg portion 68 can reside in and pass through the first window 40, and the second leg portion 70 can likewise reside in and pass through the second window 42. The first and second leg portions 68, 70 have a degree of resiliency and are capable of flexing radially-outboard and returning radially-inboard so they can snap into the groove 20 of the spigot 12 for securement. The feet portions 72 are unitary extensions of the first and second leg portions 68, 70, and depend therefrom. The feet portions 72 constitute terminal ends of the retainer 28.

During assembly and installation and use, the retainer 28 has certain positions and movements in coordination with insertion of the spigot 12 that work to conceal and reveal the data matrix 26. FIGS. 8A-8C present the sequence of positions and movements of the retainer 28. In FIG. 8A, the retainer 28 is in the first or interim position. This can be the state of the retainer 28 when the quick connector 10 is in the midst of shipping to a manufacturing facility, for instance. The spigot 12 is un-inserted here. The retainer 28 is held in place over the housing 24 and can be maintained there until insertion of the spigot 12. The first and second leg portions 68, 70 are exposed within the main passage 32 in the first position. Here too, the bridge portion 66 physically obstructs and blocks the data matrix 26 from readability and scanability. As demonstrated by FIG. 8A, the bridge portion 66 partially obstructs and blocks the data matrix 26 in the first position. Testing has found that this partial obstruction is effective—a camera was unable to read a data matrix when attempting to do so from a perpendicular direction relative to the data matrix (i.e., from the top view of FIG. 4), and when attempting to do so from a direction at an angle with the perpendicular direction. Still, in other embodiments, the bridge portion 66 can more fully or entirely obstruct and block the data matrix 26. Furthermore, the first position is represented in FIGS. 1-6 by arrow F.

In FIG. 8B, the retainer 28 is in the midst of being moved from the first position and to the second position. The spigot 12 is partly inserted in the housing 24 and within the main passage 32. The spigot's ramp 18 comes into surface-to-surface engagement with the first and second leg portions 68, 70. The first and second leg portions 68, 70 are in turn urged radially-outboard and out of the main passage 32, and the retainer 28 is displaced radially-outboard from its previous location. The bridge portion 66 is lifted off of, and away from, the data matrix 26. The bridge portion 66 is displaced radially-outboard of the first rib 48 and, in a similar way, the first and second leg portions 68, 70 are displaced radially-outboard of the third and fourth ribs 52, 54. Engagement by the ramp 18 further causes axially-rearward movement and axially-rearward displacement of the retainer 28 with respect to the housing 24 and relative to the first and third and fourth ribs 48, 52, 54. This axially-rearward movement and displacement is in-line with the insertion direction of the spigot 12 in the quick connector 10.

Lastly, in FIG. 8C, the retainer 28 is in the second or installed position. The spigot 12 is fully inserted here. The first and second leg portions 68, 70 are received in the groove 20 and remain therein, keeping the quick connector 10 and spigot 12 secured together. The bridge portion 66 is located axially-rearward of the data matrix 26 in the second position, fully revealing the data matrix 26 for proper reading and scanning. Movement to the second position unobstructs and unblocks the data matrix 26. Further, the second position is represented in FIGS. 1-6 by arrow S. Movement of the retainer 28 from the first position and to the second position is momentary; the retainer 28 effectively jumps the first, third, and fourth ribs 48, 52, 54 to get to the second position. In this embodiment, the action of revealing the data matrix 26 lacks direct and local involvement of the keying ridges 22 of the spigot 12, and instead primarily and solely involves interaction with and engagement by the spigot's ramp 18. In other words, revealing the data matrix 26 for reading and scanning is carried out independent of keying ridges or other indexing features of the spigot 12, readying employment of the quick connector 10 with spigots having different sorts of such features or even lacking such features altogether.

Figure 9:
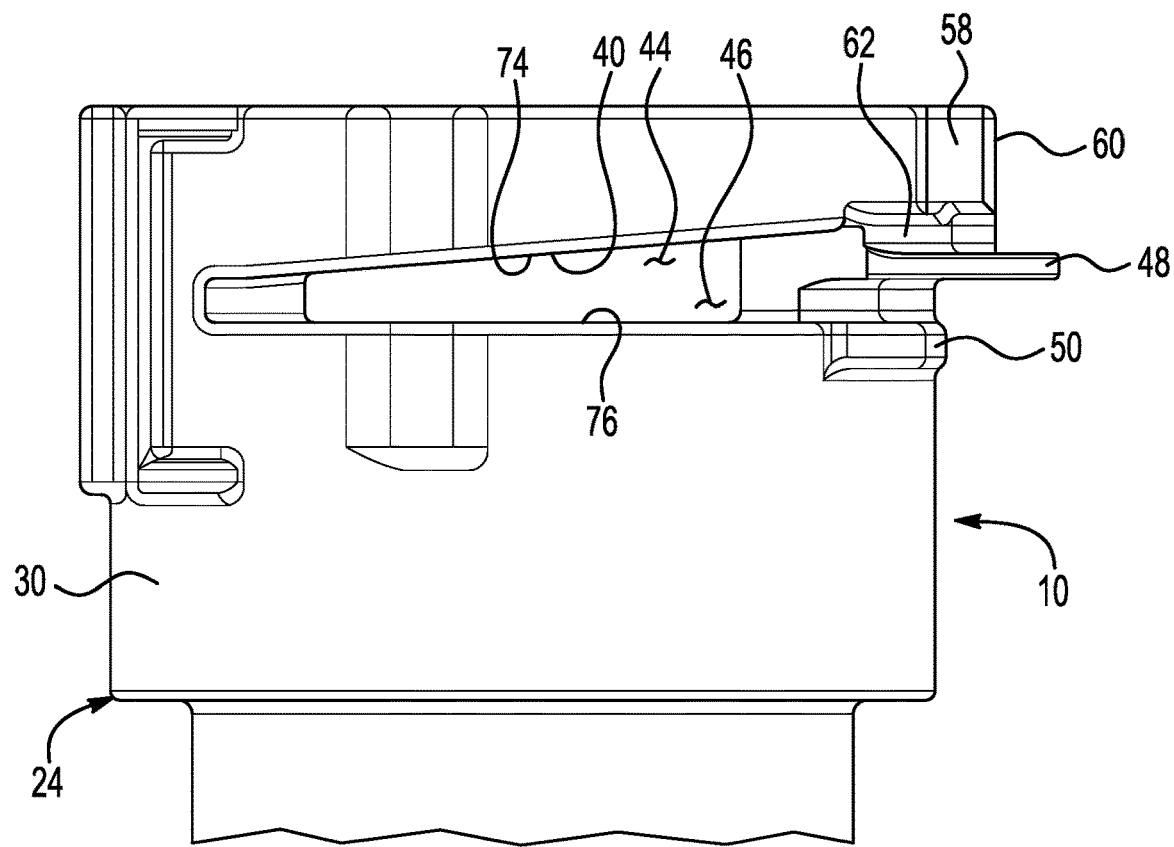
FIG. 9 is another embodiment of the quick connector.
Figure 10:
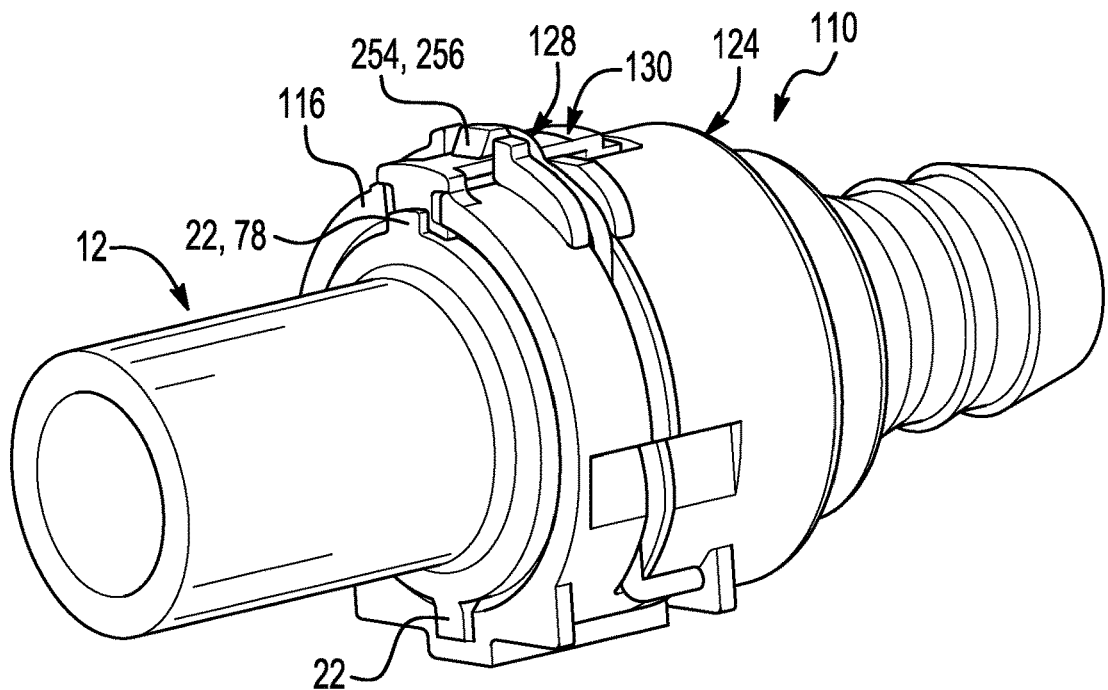
FIG. 10 is a perspective view of another embodiment of the quick connector.
Figure 11:
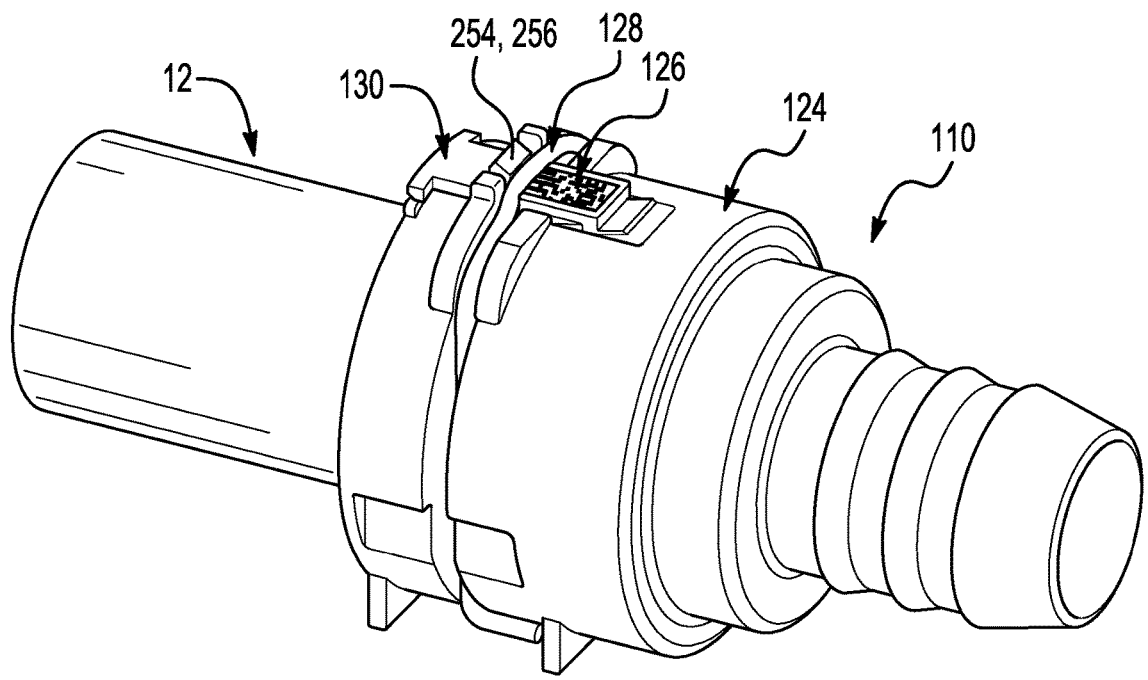
FIG. 11 is another perspective view of the quick connector of FIG. 10.
Figure 12:
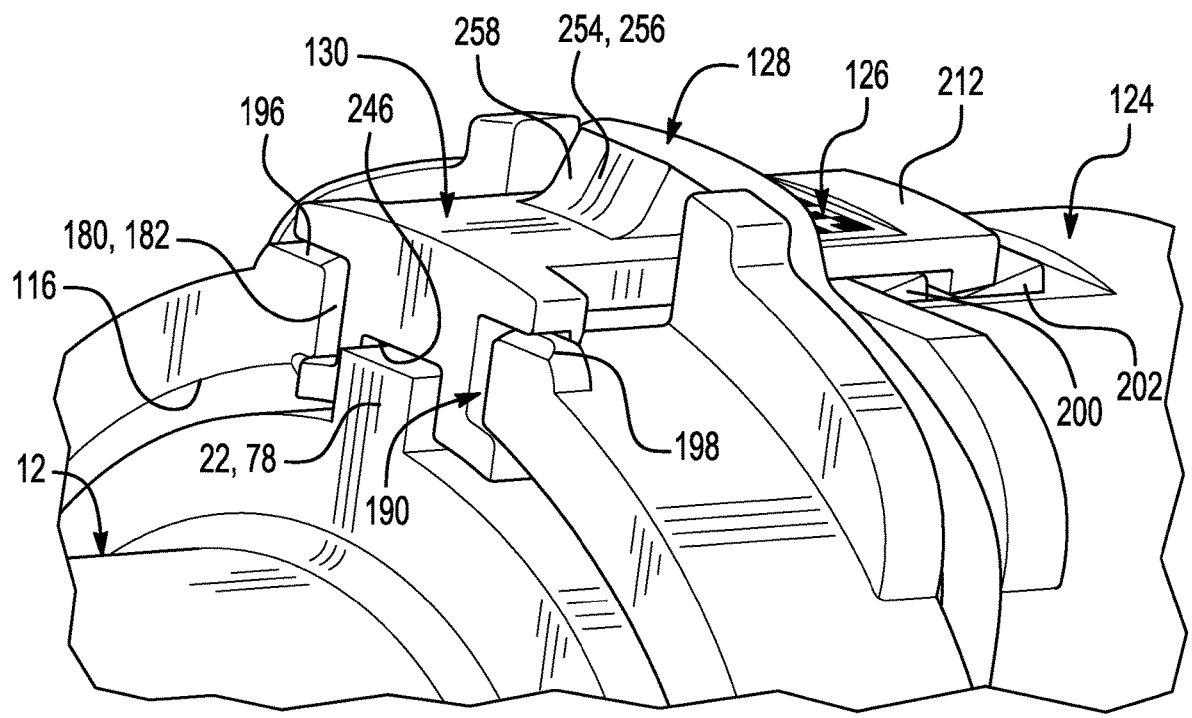
FIG. 12 is an enlarged view of an embodiment of a slide of the quick connector of FIG. 10.
Figure 13:
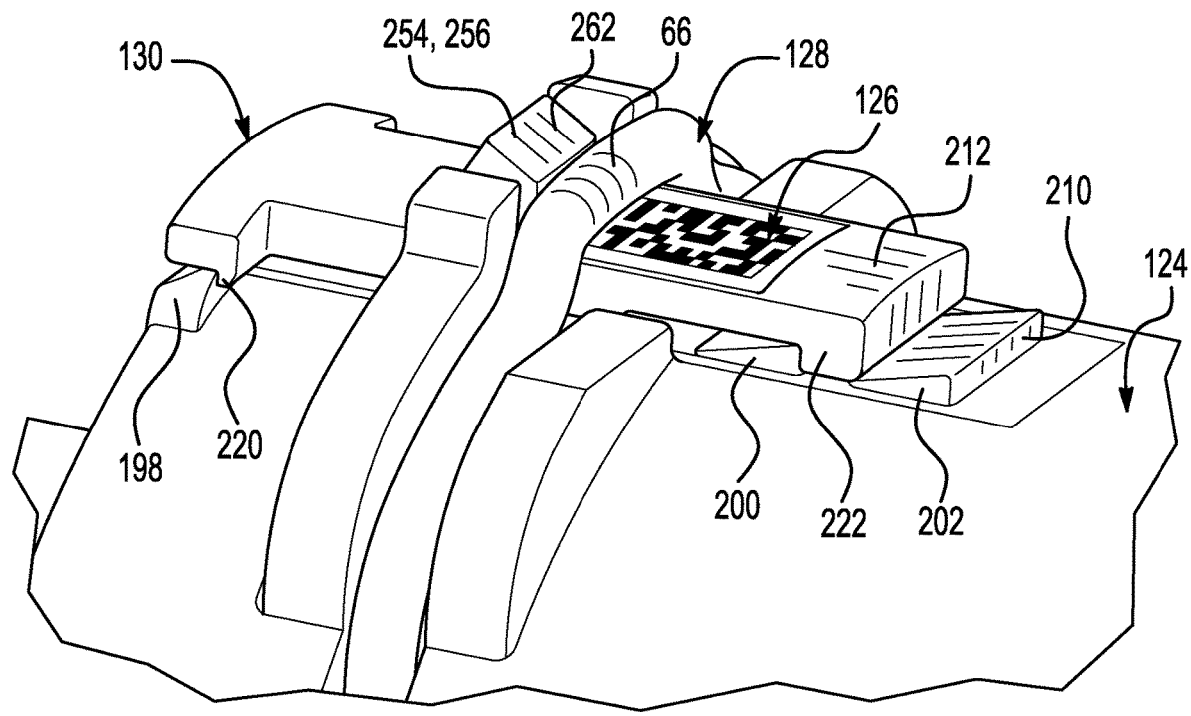
FIG. 13 is another enlarged view of the slide.

Another embodiment of the quick connector 10 is presented in FIG. 9. The housing 24 differs in this embodiment. The first and second windows 40, 42 are established in part by a forward side 74 that is inclined relative to a rearward side 76. The forward side 74 is slanted axially-forward with respect to a radial direction in FIG. 9. By this arrangement, the retainer 28 sits inclined axially-forward in the first position, and is situated in-line with the radial direction in the second position. Further, compared to the previous embodiment, in FIG. 9 the third and fourth ribs 52, 54 are absent and only the first rib 48 is provided to help maintain the location of the retainer 28 in the first position. From the first position to the second position, the retainer 28 in the embodiment of FIG. 9 hence need only effectively jump the first rib 48.

Figure 14:
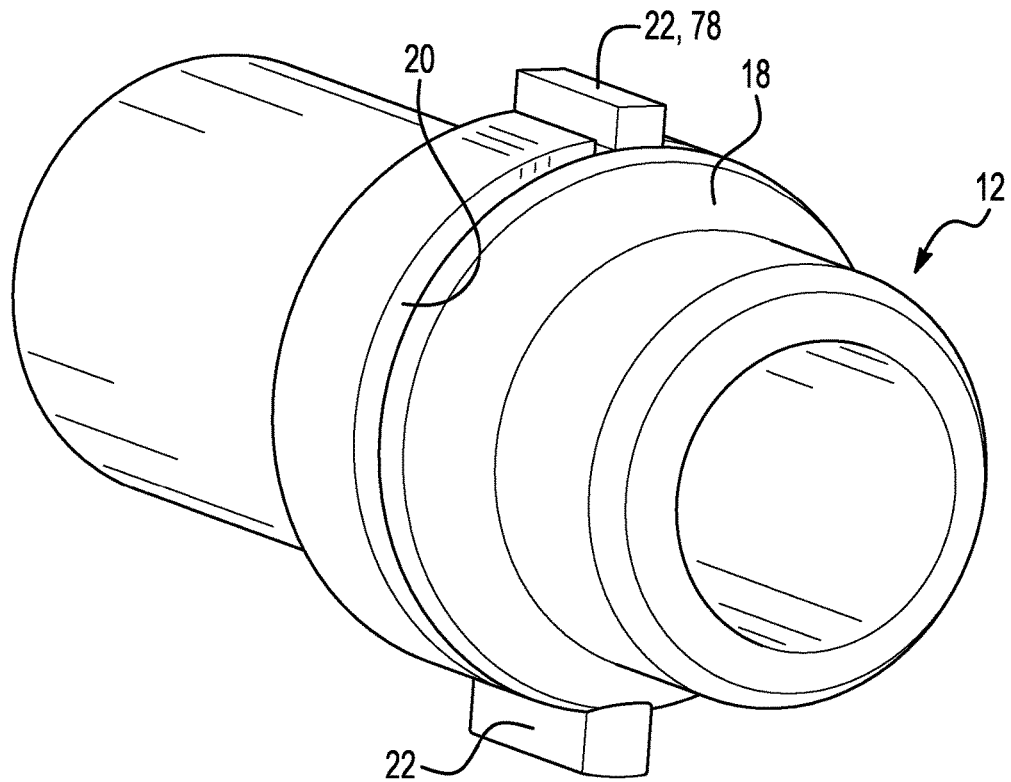
FIG. 14 is a perspective view of an embodiment of a spigot.

Yet another embodiment of a quick connector 110 is presented in FIGS. 10-23. This embodiment exhibits similarities with the embodiments of FIGS. 1-9, and the similarities may not be repeated here. Indeed, corresponding components and elements are numbered similarly but with the numerals 1xx as an indication of the embodiment of FIGS. 10-23. With initial reference to FIGS. 14 and 23, one of the keying ridges 22 of the spigot 12 serves to interact with a slide (introduced below) of the quick connector 110 by prompting movement of the slide via insertion of the spigot's end formation in the quick connector 110. This keying ridge 22—also referred to as a key or protrusion 78—comes into abutment with the slide upon insertion of the spigot 12 in the quick connector 110, and urges movement of the slide. The protrusion 78 can differ in design, size, and/or construction compared to the other keying ridge 22 not intended for interaction with the slide; its precise design, size, and/or construction can be dictated in part or more by the design, size, and/or construction of the slide.

Figure 15:
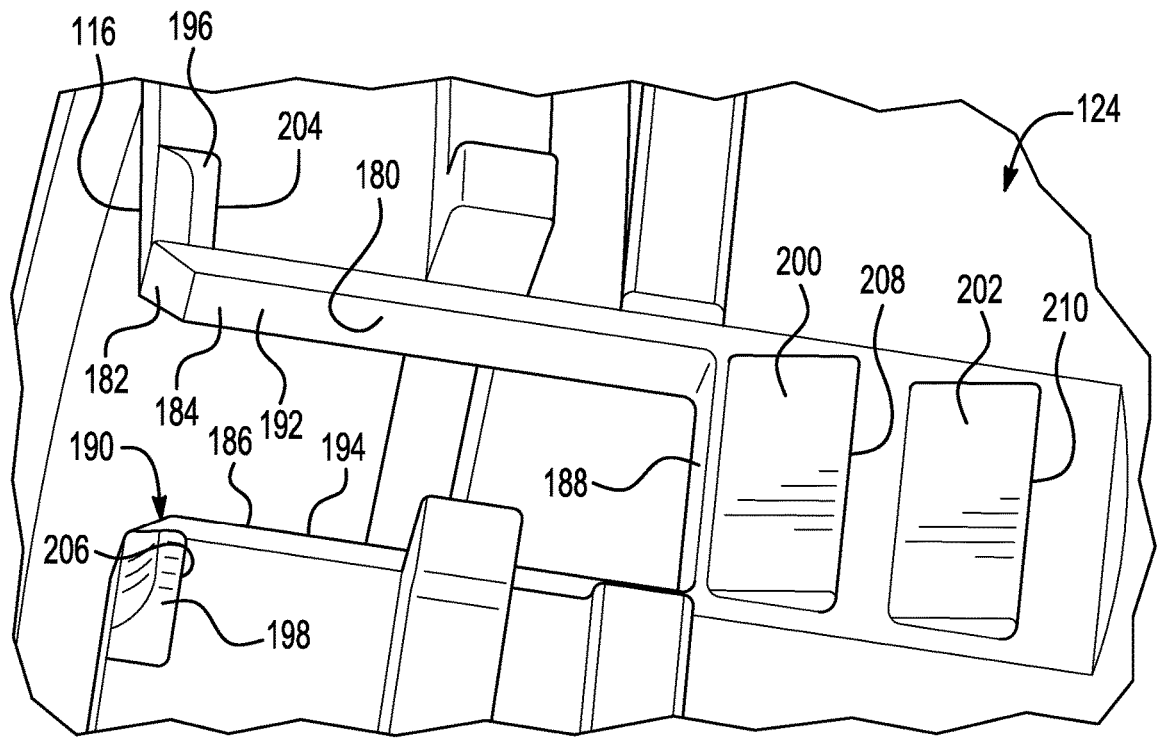
FIG. 15 is an enlarged view of an embodiment of a section of a housing that interacts with the slide.
Figure 16:
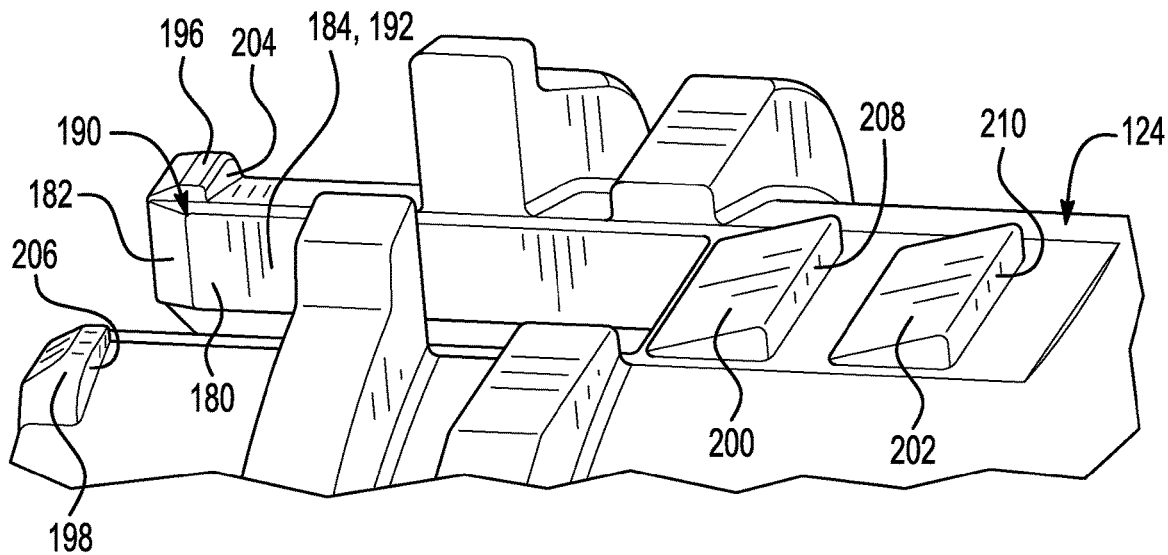
FIG. 16 is another enlarged view of the section of the housing.
Figure 17:
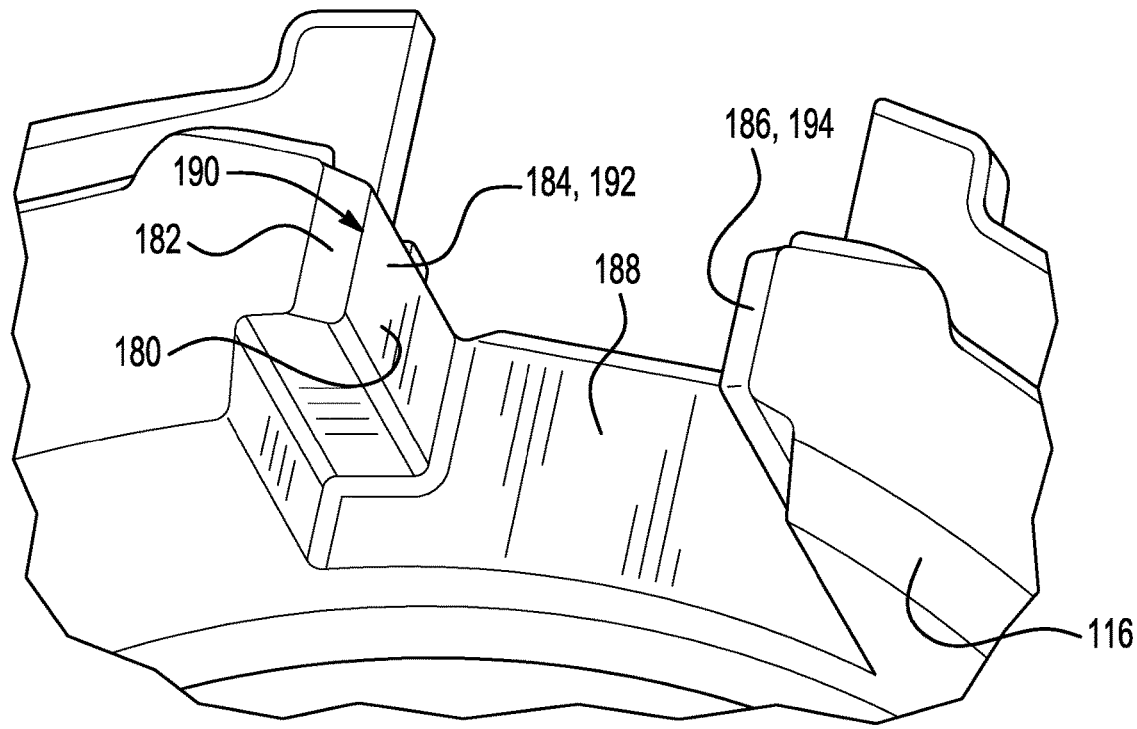
FIG. 17 is an enlarged view of an embodiment of a slot that can be used with the slide.
Figure 18:
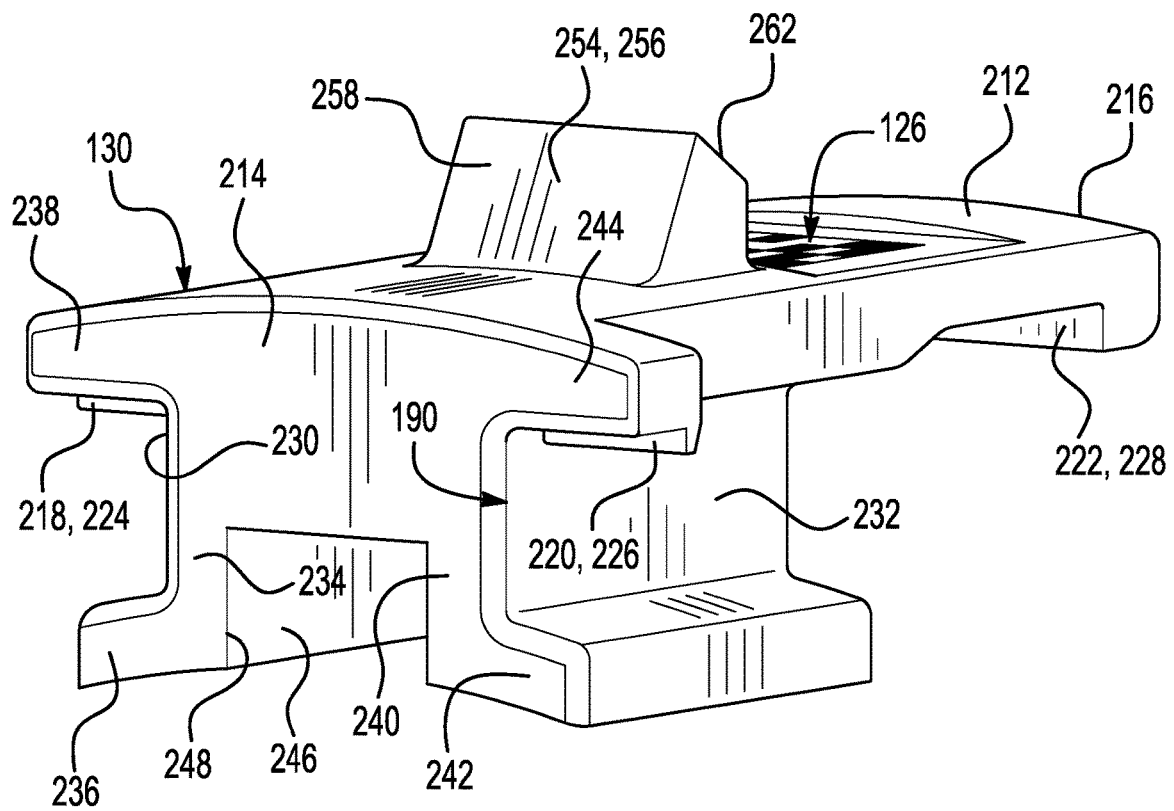
FIG. 18 is a front perspective view of the slide.
Figure 19:
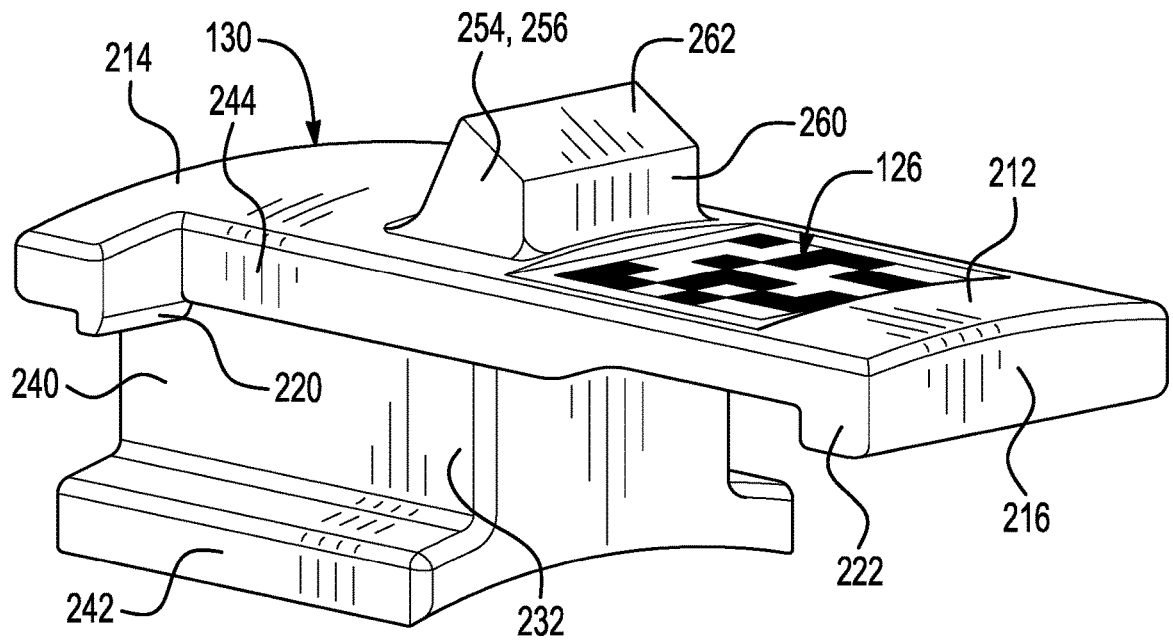
FIG. 19 is a rear perspective view of the slide.
Figure 20:
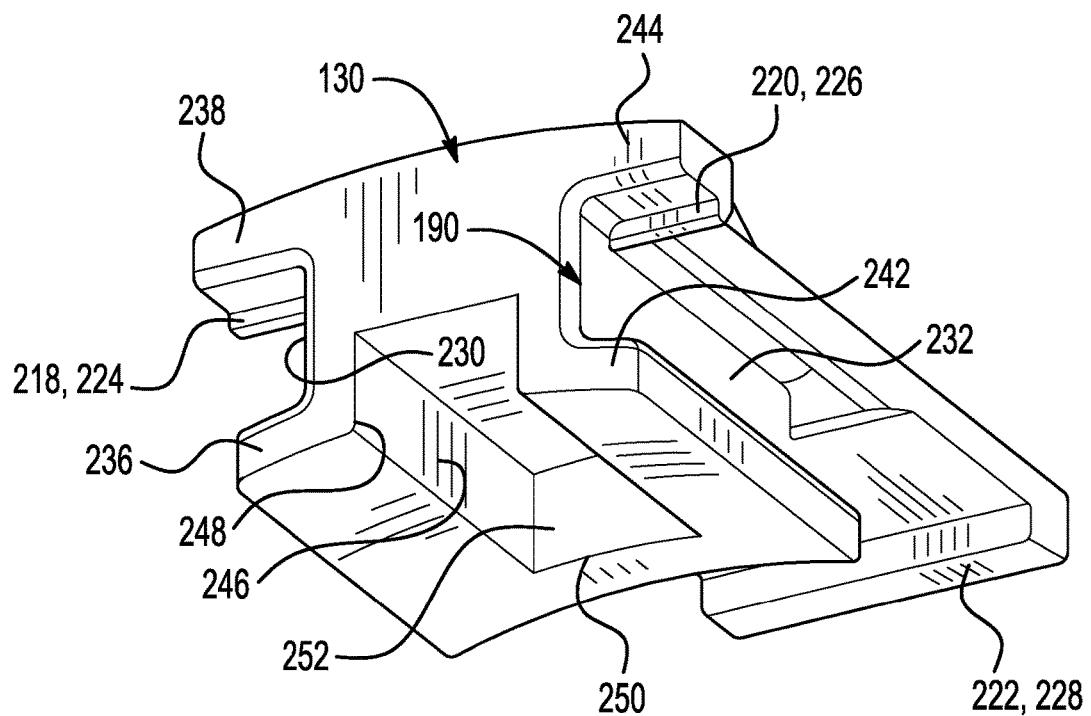
FIG. 20 is a bottom perspective view of the slide.
Figure 21:
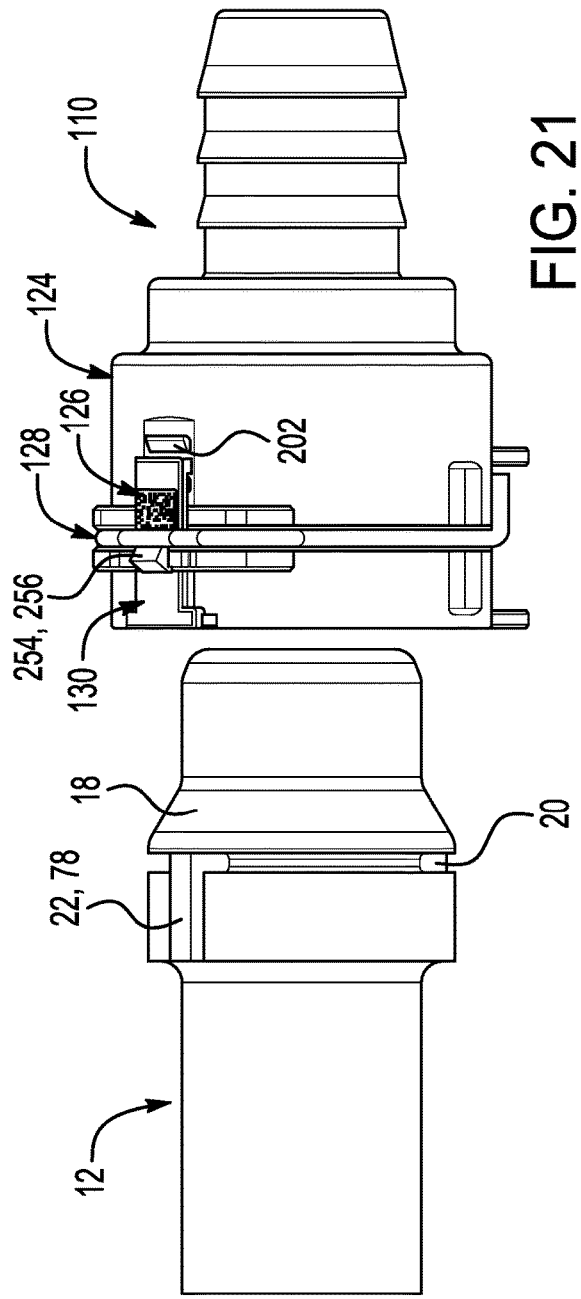
FIG. 21 shows the quick connector of FIG. 10 with the spigot not inserted therein and with the slide in a first position.

Like the previous embodiments, the quick connector 110 of FIGS. 10-23 is shown with an in-line configuration in the figures, but could have an elbow or L-shaped configuration in other embodiments. With more general reference to FIGS. 10-23, in this embodiment the quick connector 110 includes a housing 124, a data matrix 126, a retainer 128, and a slide 130; still, in other embodiments similar to this one, the quick connector 110 could have more, less, and/or different components. Referring particularly to FIGS. 15-17, the housing 124 has a slot 180 residing at a first open end 116. The slot 180 receives insertion of the slide 130 in assembly of the quick connector 110. The slot 180 has an open end 182 for such reception and insertion. A first side wall 184, a second side wall 186, and an end wall 188 establish and define the slot 180. To furnish controlled translatable movement of the slide 130 in the slot 180, the slot 180 can be outfitted with a counterpart of a guide rail and channel interfit 190; still, other measures for furnishing such movement are possible in other embodiments. In the embodiment here, the slot 180 has a first rail 192 and a second rail 194 of the guide rail and channel interfit 190. The first rail 192 and second rail 194 project circumferentially inboard of the slot 180 and toward each other, as perhaps illustrated best in FIG. 17. The first rail 192 projects from the first side wall 184, and the second rail 194 projects from the second side wall 186. Still, in other embodiments, the slot 180 could have channels of the guide rail and channel interfit 190, or some other construction.

In order to preclude and prevent unwanted and unintended movement of the slide 130 when received in the slot 180—such as during shipping and handling of the quick connector 110 with the slide 130 assembled, when the retainer 128 is in the midst of being moved from the first position to the second position, as well as at other times— detent surfaces of the housing 124 and of the slide 130 can be provided for surface-to-surface engagement and abutment. Interference between confronting detent surfaces constrains movement of the slide 130 with respect to the housing 124 and with respect to the slide 130. The detent surfaces can be provided in different ways and by different constructions.

With reference to FIGS. 15 and 16, in this embodiment the housing 124 has a first projection 196, a second projection 198, a first ramp 200, and a second ramp 202. The first and second projections 196, 198 aid in keeping the slide 130 in a first position, and protrude radially-outboard of the housing 124. A first detent surface 204 of the first projection 196 comes into engagement with a confronting and cooperating detent surface (introduced below) of the slide 130. Likewise, a second detent surface 206 of the second projection 198 comes into engagement with a confronting and cooperating detent surface (introduced below) of the slide 130. The first projection 196 is located at the open end 182 at one side of the slot 180, and the second projection 198 is located at the open end 182 at an opposite side of the slot 180. The first ramp 200 aids in keeping the slide 130 in its first position (e.g., FIG. 21), and the second ramp 202 aids in keeping the slide 130 in a second position (e.g., FIG. 22). The first and second ramps 200, 202 protrude radially-outboard of the housing 124. A third detent surface 208 of the first ramp 200 comes into engagement with a confronting and cooperating detent surface (introduced below) of the slide 130, and similarly a fourth detent surface 210 of the second ramp 202 comes into engagement with a confronting and cooperating detent surface (introduced below) of the slide 130. The first and second ramps 200, 202 are arranged in tandem relative to each other, with the first ramp 200 positioned axially-forward of the second ramp 202, and the second ramp 202, in turn, positioned axially-rearward of the first ramp 200. The first and second ramps 200, 202 are located axially-rearward of the slot 180 and adjacent the end wall 188. Vertically-upward slopes of the first and second ramps 200, 202 span in the axially-rearward direction.

As in the previous embodiments, the data matrix 126 assists in the detection and verification of an intended and proper connection between the quick connector 110 and the spigot 12. Only when the spigot's end formation is fully inserted within the housing 124 can the data matrix 126 be appropriately read and scanned by the device. Absent that condition, such as when the spigot 12 lacks full insertion, the device is unable to suitable read and scan the data matrix 126. Moreover, in the embodiment of FIGS. 10-23, only when the slide 130 is in its second position can the data matrix 126 be appropriately read and scanned by the device. Absent that state, such as when the slide 130 is in its first position, the device is unable to suitable read and scan the data matrix 126. The ability to read the data matrix 126 can serve as an indication that connection has been made between the quick connector 110 and the spigot 12, and that the slide 130 is in its second position. Conversely, the inability to read the data matrix 126 can serve as an indication that connection has not been made between the quick connector 110 and the spigot 12, and that the slide 130 is in its first position. Moreover, as before, the detection and verification furnished by the data matrix 126 may be supplemental to other measures of physical and visual verification exhibited by the quick connector 110, depending on the particular embodiment. In the embodiment of FIGS. 10-23, for example, verification of connection is also had by observing the position of the slide 130 relative to the housing 24 in applications where such observation is available.

In the embodiment of FIGS. 10-23, the data matrix 126 is carried by the slide 130 and moves with the slide 130 when the slide 130 is prompted to move from its first position and to its second position. In other words, and unlike the previous embodiments of FIGS. 1-9, the data matrix 126 is fixed to the slide 130 and hence remains static relative thereto, but moves with the slide 130 relative to the housing 124 upon movement of the slide 130. The data matrix 126 resides on an exterior surface 212 of the slide 130. The exterior surface 212, in assembly, is generally accessible at the housing's exterior. With respect to a detent (introduced below) of the slide 130, the data matrix 126 is located axially-rearward thereof—indeed, as perhaps shown best by FIGS. 19 and 22, the data matrix 126 can span to the detent in the axial forward direction.

As in the previous embodiments, the retainer 128 keeps hold of the spigot 12 once the spigot 12 is inserted properly into the quick connector 110. The retainer 128 further serves to partially or more conceal and obstruct the data matrix 126 from reading and scanning when the slide 130 is in the first position and when connection between the quick connector 110 and spigot 12 is lacking, and serves to reveal the data matrix 126 for suitable reading and scanning when the slide 130 is in the second position and when connection between the quick connector 110 and spigot 12 has been made. The ability and inability to read and scan the data matrix 126 is carried out in coordination with movements of the retainer 128 and with movements of the slide 130. Unlike the previous embodiments, the retainer 128 is not intentionally displaced in the axial direction upon being engaged by the ramp 18 for revealing the data matrix 126, and rather is brought to the same axial position with respect to the housing 124 when the data matrix 126 is obstructed and revealed. In this regard, the retainer's positions and movements are generally confined to radially-outboard and radially-inboard displacement actions. Revelation of the data matrix 126 for reading and scanning is more dependent on movement of the slide 130, per this embodiment. The retainer's bridge portion 66 is situated axially-rearward of the slide's detent when the slide 130 is in the first position (e.g., FIGS. 13 and 21), and is conversely situated axially-forward of the slide's detent when the slide 130 is in the second position (e.g., FIG. 22). When axially-rearward of the slide's detent, the bridge portion 66 physically overlaps and obstructs and blocks a section or more of the data matrix 126. The blocked section is a lateral extent and portion of the data matrix 126, per this embodiment. When axially-forward of the slide's detent, the bridge portion 66 no longer blocks the section of the data matrix 126.

The slide 130 moves in coordination with insertion of the spigot 12 and with movement action of the retainer 128 in order to reveal the data matrix 126 for reading and scanning upon full insertion of the spigot 12 in the quick connector 110. The slide 130 carries the data matrix 126. The slide 130 can have various designs, constructions, and components in different embodiments, depending in part or more upon its intended movement, the construction of the housing 124, and/or other factors. With reference now to FIGS. 12 and 18-20, in this embodiment the slide 130 is assembled in place with the housing 124 and is inserted in the slot 180. The slide 130 is translatable relative to the housing 124 and about the slot 180. The slide 130 is a single, unitary body that is composed of a plastic material. It extends lengthwise from a first and forward end 214, to a second and rearward end 216. Cooperating detent structures and surfaces prevent unintended movement of the slide 130 when received in the slot 180. In this embodiment, the slide 130 has a first projection 218, a second projection 220, and a third projection 222. The first projection 218 interacts with the housing's first projection 196; the second projection 220 interacts with the housing's second projection 198; and the third projection 222 selectively interacts with the housing's first and second ramps 200, 202. The first and second projections 218, 220 aid in keeping the slide 130 in its first position, and protrude radially-inboard of the slide 130. A first detent surface 224 of the first projection 218 comes into engagement and surface-to-surface abutment with the first detent surface 204 of the first projection 196, and a second detent surface 226 of the second projection 220 comes into engagement and surface-to-surface abutment with the second detent surface 206 of the second projection 198. The first projection 218 is located at the first end 214 at one side of the slide 130, and the second projection 220 is located at the first end 214 at an opposite side of the slide 130.

When engaged with the first ramp 200, the third projection 222 aids in keeping the slide 130 in the first position. Conversely, when engaged with the second ramp 202, the third projection 222 aids in keeping the slide 130 in the second position. The third projection 222 protrudes radially-inboard of the slide 130. A third detent surface 228 of the third projection 222 comes into engagement and surface-to-surface abutment with the third detent surface 208 of the first ramp 200 when the slide 130 is in the first position. Similarly, the third detent surface 228 of the third projection 222 comes into engagement and surface-to-surface abutment with the fourth detent surface 210 of the second ramp 202 when the slide 130 is in the second position. The third projection 222 is located at the second end 216 of the slide 130, and indeed constitutes a terminal end of the slide 130 according to this embodiment.

With continued reference to FIGS. 12 and 18-20, in order to furnish controlled translatable movement of the slide 130 in the slot 180, the slide 130 in this embodiment has a first channel 230 and a second channel 232 of the guide rail and channel interfit 190. The first channel 230 receives the first rail 192 at the slot 180, and the second channel 232 receives the second rail 194 at the slot 180. The first channel 230 is established via a first side wall 234, a first bottom wall 236, and a first top wall 238. The second channel 232 is similarly established via a second side wall 240, a second bottom wall 242, and a second top wall 244. The first and second channels 230, 232 are located on opposite sides of the slide 230 relative to each other. Still, in other embodiments the slide 130 could have rails of the guide rail and channel interfit 190, or some other construction. Furthermore, the slide 130 has a recess 246 on its bottom side for reception of the protrusion 78 of the spigot 12 when the spigot 12 is inserted in the quick connector 110. The protrusion 78 is shown received in the recess 246 in FIG. 23. The recess 246 is established interiorly of the first and second channels 230, 232, and spans axially and longitudinally from an open end 248 to a closed end 250. At the closed end 250, the slide 130 has an abutment wall 252. A leading surface of the protrusion 78 comes into engagement and surface-to-surface abutment with the abutment wall 252 when the spigot 12 is inserted in the quick connector 110. The engagement urges movement of the slide 130 with the spigot 12 and relative to the housing 124—once engagement occurs, the slide 130 is moved by the spigot 12.

Referring to FIGS. 12, 13, 18, and 19, to facilitate movement and positioning of the slide 130 in its first and second positions—and in coordination with the radial displacement actions of the retainer 128—a detent 254 is disposed at an upper side of the slide 130 for interaction with the retainer 128 during use of the quick connector 110. The detent 254 helps keep the slide 130 in its first position, and conversely helps keep the slide 130 in its second position. The detent 254 can take various designs and constructions according to different embodiments. In this embodiment, the detent 254 is in the form of a protrusion 256. The protrusion 256 is located about midway of the lengthwise and axial extent of the slide 130, and juts radially-outboard from the exterior surface 212 of the slide 130. Its location is dictated, at least in part, by the expected proximity of the retainer 128 on the slide 130 when the slide 130 is in the first and second positions. The retainer 128 is located on an axially-rearward side of the protrusion 256 when the slide 130 is in the first position (e.g., FIG. 21), and the retainer 128 is contrarily located on an axially-forward side of the protrusion 256 when the slide 130 is in the second position (e.g., FIG. 22).

Further, the protrusion 256 has a first side 258 and a second side 260. The first side 258 is generally directed axially-forward, and the second side 260 is generally directed axially-rearward. The retainer 128 abuts against the first side 258 when the slide 130 is in the first position, helping to keep the slide 130 in the first position; and the retainer 128 abuts against the second side 260 when the slide 130 is in the second position, helping to keep the slide 130 in the second position. In this embodiment, the first side 258 is sloped in the axially-forward direction. The slope facilitates intended movement of the slide 130 to the second position. For example, if the retainer 128 and bridge portion 66 come into engagement with the sloped first side 258 upon its radially-inboard displacement action, the engagement can urge the slide 130 in the axially-rearward direction and to the second position. In a similar manner, per this embodiment, a ramp surface 262 is provided at the protrusion 256. The ramp surface 262 spans between the first and second sides 258, 260, as depicted. The ramp surface 262 is sloped in the axially-rearward direction. The ramp surface 262 serves to re-position the slide 130 to the first position in circumstances in which insertion of the spigot 12 is only partial and incomplete. For example, when the spigot's ramp 18 engages the first and second leg portions 68, 70 and the retainer 128 is displaced radially-outboard, but the first and second leg portions 68, 70 lack reception in the spigot's groove 20. The retainer 128 and bridge portion 66 could then come into engagement with the ramp surface 262, urging the slide 130 in the axially-forward direction and back to the first position. Lastly, per this embodiment, the second side 260 is planar in configuration.

During assembly, installation, and use of the quick connector 110 of FIGS. 10-23, the slide 130 has certain positions and movements in coordination with insertion of the spigot 12 and movements of the retainer 128 that work to conceal and reveal the data matrix 126. The slide 130 has a first position, shown in FIG. 21. The first position is also an axially-forward position and an interim position of the slide 130. This can be the state of the slide 130 and the retainer 128 when the quick connector 110 is in the midst of being shipped to a manufacturing facility, for example. Here, the spigot 12 is not inserted in the quick connector 110. The retainer 128 is held in place over the housing 124 and over the slide 130. Urging from the retainer 128 helps keep the slide 130 in place. The bridge portion 66 physically obstructs and blocks the data matrix 126 from readability and scan-ability when the slide 130 is in the first position.

Figure 22:
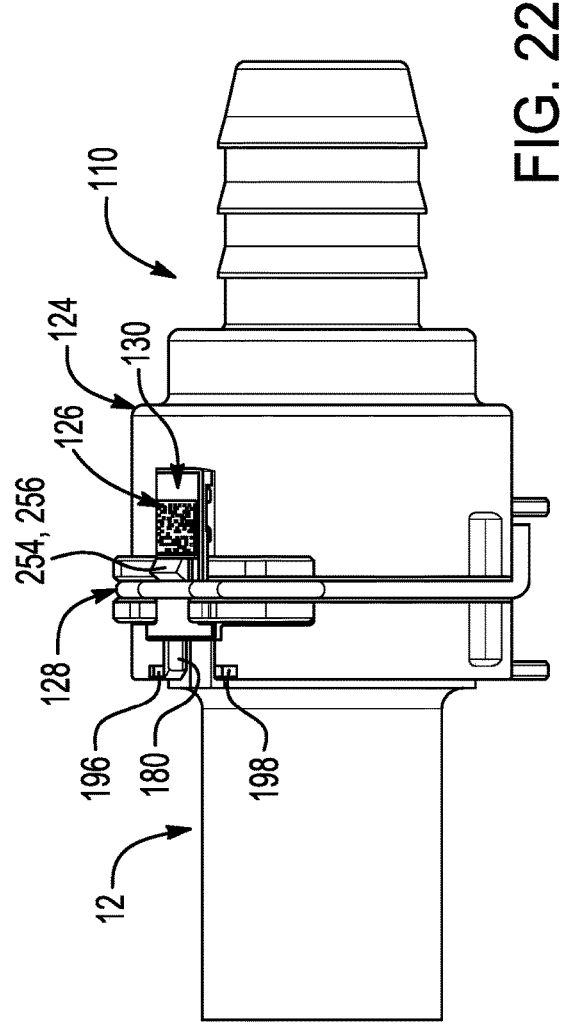
FIG. 22 shows the quick connector of FIG. 10 with the spigot inserted therein and with the slide in a second position.
Figure 23:
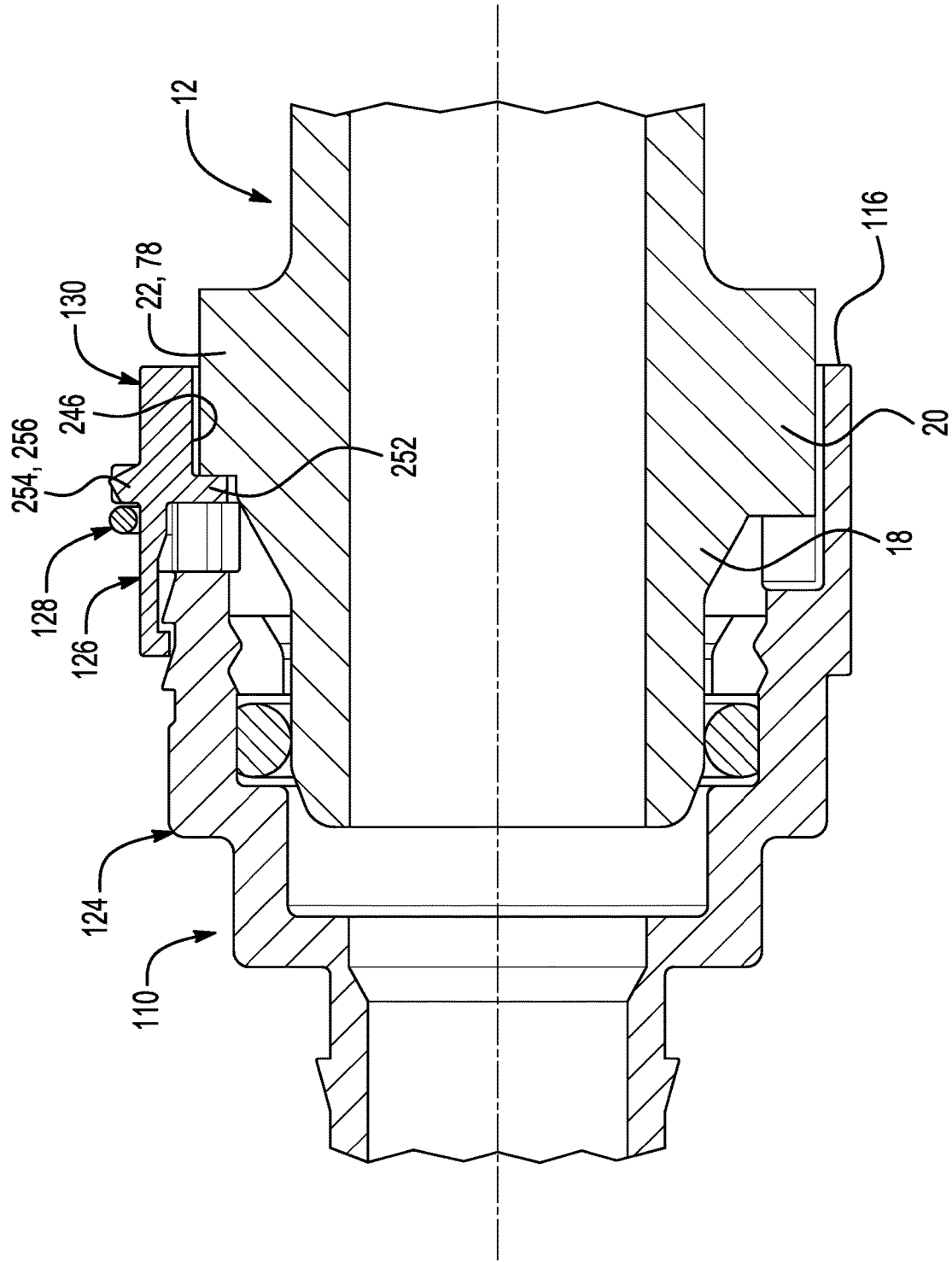
FIG. 23 is a sectional view of the quick connector of FIG. 10 with the spigot inserted therein and with the slide in the second position.

Furthermore, the slide 130 has a second position, shown in FIG. 22. The second position is also an axially-rearward position and an installed position of the slide 130. From the first position to the second position, the slide 130 translates in the axially-rearward direction. The slide 130 is axially translatable and displaced about the slot 180 and with respect to the housing 124. The slide 130 is able to move to the second position when the bridge portion 66 is momentarily lifted off of, and away from, the slide 130. The spigot's ramp 18 engages the retainer 128 before the spigot's protrusion 78 engages the abutment wall 252 of the slide 130. The spigot 12 is fully inserted in the quick connector 110 when the slide 130 is in the second position. In the second position, the retainer 128 and bridge portion 66 are located axially-forward of the data matrix 126 and axially-forward of the detent 254, per this embodiment, fully revealing the data matrix 126 for proper reading and scanning.

Still, in certain embodiments the quick connector and/or the slide need not necessarily exhibit all of the designs, constructions, and components shown and described herein, while still functioning in a suitable manner. For instance, only one or more of the detent structures and surfaces could be provided for the slide, or none of them, per some embodiments.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A fluid line quick connector, comprising:
 a housing having a main passage and at least one window;
 a data matrix;
 a retainer locatable in said at least one window, wherein a portion of said retainer at least partially obstructs said data matrix when a spigot lacks insertion in said main passage of said housing, and the at least partial obstruction of said data matrix by said portion of said retainer is absent when the spigot is fully inserted in said main passage of said housing; and
 a slide moveable with respect to said housing, said data matrix carried by said slide;
 wherein said at least one window includes a first window residing on one side of said housing and a second window residing on an opposite side of said housing, said retainer is a wire spring having a bridge portion, a first leg portion, and a second leg portion, said first leg portion is received in said first window and said second leg portion is received in said second window, and wherein said bridge portion physically overlaps and obstructs at least a section of said data matrix when the spigot lacks insertion in said main passage of said housing.

2. The fluid line quick connector as set forth in claim 1, wherein said slide has an axially-forward position relative to said housing when said portion of said retainer at least partially obstructs said data matrix, and said slide has an axially-rearward position relative to said housing when the at least partial obstruction of said data matrix by said retainer is absent.

3. The fluid line quick connector as set forth in claim 1, wherein said data matrix resides on an exterior surface of said slide.

4. The fluid line quick connector as set forth in claim 1, wherein said housing has a slot and said slide is received in said slot and is translatable therein.

5. The fluid line quick connector as set forth in claim 1, wherein said slide has a detent that interacts with said retainer to keep said slide in a first position relative to said housing and, alternatively, to keep said slide in a second position relative to said housing.

6. The fluid line quick connector as set forth in claim 5, wherein said detent is a protrusion that extends radially-outboard of said slide and said first position is an axially-forward position and said second position is an axially-rearward position, said retainer abuts against a first side of said protrusion when said slide is in the axially-forward position, and abuts against a second, opposite side of said protrusion when said slide is in the axially-rearward position.

7. The fluid line quick connector as set forth in claim 1, wherein said housing has at least one first detent surface and said slide has a least one second detent surface, engagement between said at least one first detent surface and said at least one second detent surface prevents movement of said slide in an axially-forward direction when said portion of said retainer at least partially obstructs said data matrix, or prevents movement of said slide in the axially-forward direction when the at least partial obstruction of said data matrix by said retainer is absent, or prevents movement of said slide in the axially-forward direction when said portion of said retainer at least partially obstructs said data matrix and prevents movement of said slide in the axially-forward direction when the at least partial obstruction of said data matrix by said retainer is absent.

8. The fluid line quick connector as set forth in claim 1, wherein said slide has an abutment wall engageable by the spigot when the spigot is inserted into said main passage of said housing.

9. A fluid line quick connector assembly comprising the fluid line quick connector of claim 1 and said spigot.

10. A fluid line quick connector, comprising:
a housing having a main passage and at least one window;
a data matrix; and
a retainer locatable in said at least one window, wherein a portion of said retainer at least partially obstructs said data matrix when a spigot lacks insertion in said main passage of said housing, and the at least partial obstruction of said data matrix by said portion of said retainer is absent when the spigot is fully inserted in said main passage of said housing, wherein said retainer has a first position with respect to said housing and has a second position with respect to said housing, the first position being axially-forward relative to the second position, displacement of said retainer from the first position to the second position is prompted by insertion of the spigot in said main passage of said housing, wherein, in the first position said portion of said retainer at least partially obstructs said data matrix, and in the second position the at least partial obstruction of said data matrix by said retainer is absent.

11. The fluid line quick connector as set forth in claim 10, wherein said data matrix resides on an exterior surface of said housing and said data matrix remains static with respect to said housing when said retainer moves from the first position to the second position.

12. The fluid line quick connector as set forth in claim 10, wherein said housing has at least one rib that protrudes radially-outboard therefrom, and wherein in the first position an adjacent portion of said retainer is situated axially-forward of said at least one rib, and in the second position said adjacent portion of said retainer is situated axially-rearward of said at least one rib.

13. A fluid line quick connector, comprising:
a housing;
a slide moveable from a first position with respect to said housing to a second position with respect to said housing;
a data matrix moveable with said slide; and
a retainer having a portion that at least partially obstructs said data matrix when said slide is in the first position, the partial obstruction of said data matrix by said portion of said retainer being absent when said slide is in the second position, wherein said retainer is a wire spring having a bridge portion, said bridge portion overlaps and blocks at least a section of said data matrix when said slide is in the first position.

14. The fluid line quick connector as set forth in claim 13, wherein said first position is an axially-forward position of said slide with respect to said housing, and said second position is an axially-rearward position of said slide with respect to said housing.

15. The fluid line quick connector as set forth in claim 13, wherein said slide has a protrusion that interacts with said retainer to keep said slide in the first position or to keep said slide in the second position.

16. The fluid line quick connector as set forth in claim 13, wherein said slide is axially translatable from the first position to the second position via a guide rail and channel interfit effected between said slide and said housing.

17. The fluid line quick connector as set forth in claim 13, wherein said housing has at least one first detent surface and said slide has a least one second detent surface, engagement between said at least one first detent surface and said at least one second detent surface prevents movement of said slide from the first position, or prevents movement of said slide from the second position, or prevents movement of said slide from the first position and prevents movement of said slide from the second position.

18. The fluid line quick connector as set forth in claim 13, wherein said slide and said data matrix remain at an exterior of said housing when said slide is in the first position and when said slide is in the second position.

19. A fluid line quick connector, comprising:
a housing having a main passage, a slot, and at least one window;
a slide received in said slot and translatable in said slot from a first position to a second position, said slide having a detent;
a data matrix carried by said slide; and
a wire spring having at least one leg portion locatable in said at least one window, said wire spring further having a bridge portion, said bridge portion at least partially obstructing said data matrix when said slide is in the first position, the partial obstruction of said data matrix by said bridge portion being absent when said slide is in the second position, abutment between said bridge portion and said detent precluding movement of said slide in at least one direction when said slide is in the first position, and abutment between said bridge portion and said detent precluding movement of said slide in at least one direction when said slide is in the second position.

20. The fluid line quick connector as set forth in claim 19, wherein said slide is axially translatable in said slot, said first position is an axially-forward position of said slide with respect to said housing, and said second position is an axially-rearward position of said slide with respect to said housing.

* * * * *

UNITED STATES PATENT AND TRADEMARK OFFICE
CERTIFICATE OF CORRECTION

| | | |
|---|---|---|
| PATENT NO. | : 12,085,207 B2 | Page 1 of 1 |
| APPLICATION NO. | : 17/955960 | |
| DATED | : September 10, 2024 | |
| INVENTOR(S) | : Lee Teasley et al. | |

It is certified that error appears in the above-identified patent and that said Letters Patent is hereby corrected as shown below:

In the Claims

Column 14, Line 51, replace the phrase "a least one second detent surface" with "at least one second detent surface"

Column 16, Line 14, replace the phrase "a least one second detent surface" with "at least one second detent surface"

Signed and Sealed this
Twenty-ninth Day of October, 2024

*Katherine Kelly Vidal*

Katherine Kelly Vidal
*Director of the United States Patent and Trademark Office*